United States Patent
Ikari

(10) Patent No.: US 7,982,921 B2
(45) Date of Patent: Jul. 19, 2011

(54) DEVICE FOR CORRECTING IMAGE DATA READ WITH IMAGE SENSOR

(75) Inventor: Daiki Ikari, Ayase (JP)

(73) Assignee: Canon Kabushiki Kaisha, Tokyo (JP)

( * ) Notice: Subject to any disclaimer, the term of this patent is extended or adjusted under 35 U.S.C. 154(b) by 374 days.

(21) Appl. No.: 12/351,729

(22) Filed: Jan. 9, 2009

(65) Prior Publication Data

US 2009/0180134 A1 Jul. 16, 2009

(30) Foreign Application Priority Data

Jan. 10, 2008 (JP) ................................. 2008-003495

(51) Int. Cl.
*H04N 1/40* (2006.01)

(52) U.S. Cl. ........ 358/448; 358/1.13; 358/504; 358/2.1; 358/1.9; 358/3.26; 382/112

(58) Field of Classification Search .................. 358/448, 358/1.13, 3.26, 504, 2.1; 382/112
See application file for complete search history.

(56) References Cited

U.S. PATENT DOCUMENTS

| | | | |
|---|---|---|---|
| 7,548,344 B2 * | 6/2009 | Matsuya | 358/1.9 |
| 7,789,478 B2 * | 9/2010 | Nakano et al. | 347/19 |
| 2004/0012815 A1 * | 1/2004 | Fuchigami | 358/2.1 |
| 2004/0233467 A1 * | 11/2004 | Namizuka | 358/1.13 |
| 2005/0140991 A1 * | 6/2005 | Ogiwara et al. | 358/1.2 |
| 2007/0046923 A1 * | 3/2007 | Nakano et al. | 355/78 |
| 2007/0121179 A1 * | 5/2007 | Yoshida et al. | 358/504 |
| 2008/0063240 A1 * | 3/2008 | Keng et al. | 382/112 |

FOREIGN PATENT DOCUMENTS

| | | |
|---|---|---|
| JP | 2002-077584 A | 3/2002 |
| JP | 2004-193742 A | 7/2004 |

* cited by examiner

*Primary Examiner* — Twyler L Haskins
*Assistant Examiner* — Michael Burleson
(74) *Attorney, Agent, or Firm* — Canon U.S.A. Inc., I.P. Division

(57) ABSTRACT

An image processing device is provided which corrects error pixels without using a line buffer even in the case of using an image sensor with a structure having a plurality of sensors arranged in series. It has a detecting component for detecting the presence or absence of a factor of black line and Kth error pixel correcting processing components each for receiving the Kth pixel signal among the pixel signals output in N divisions, and for correcting error pixels. When the factor of black line is detected at a boundary between Kth and (K−1)th division outputs, the Kth error pixel correcting processing component notifies the (K−1)th error pixel correcting processing component of neighboring pixel information about the error pixels, and the (K−1)th error pixel correcting processing component corrects the error pixels at the boundary in response to the neighboring pixel information notified and the (K−1)th pixel signal.

11 Claims, 22 Drawing Sheets

DEVICE FOR CORRECTING IMAGE DATA READ WITH IMAGE SENSOR

BACKGROUND OF THE INVENTION

1. Field of the Invention

The present invention relates to a technique of correcting image data read from an original document, and more particularly to a technique of correcting error pixels in the image data read without using a line buffer even in the case of reading the original document with an image sensor such as a CIS sensor having a plurality of sensors arranged in series in a reading optical system.

2. Description of Related Art

Conventionally, some copying machines have a system of reading original documents with optical reading equipment fixed at a document reading position while conveying the original documents, which are set on an automatic document conveying device, one after another automatically. In the system, if noise or dusts adhere to the document reading position, or if scratches or stains stick to it, the same noise or the like is always read because the position of the optical reading equipment is fixed. As a result, a black line can sometimes appear in a read image. Thus, the noise, dusts, scratches, stain or the like can be a factor of causing a black line in the read image if they remain on the document reading position. As a technique of preventing such a black line from appearing, a technique is known which detects the black line caused by noise or the like on the document reading position and which makes the black line inconspicuous by correcting it. The technique performs, on pixels in the image region where the black line is detected (referred to as "error pixels" from now on), correcting processing or replacing processing using normal pixels in the neighborhood of the error pixels (see Japanese Patent Laid-Open No. 2002-77584, for example).

In addition, as a reading system of optical reading equipment, there is a CIS system using a contact type image sensor (referred to as a "CIS sensor" from now on) with a configuration having a plurality of sensors (photosensitive chips) arranged in series. The CIS system is a system that illuminates an original document with light beams originating from light sources comprising RGB LEDs, and scans by successively receiving the reflected light with the CIS sensor. The CIS system is also called a "contact sensor system" because LEDs, lenses, and a CIS sensor are integrated into sticks of the same length. The sticks are disposed in contact with one another. However, it sometimes occurs that gaps of several pixels take place between sticks. There may be sometimes black lines due to the gaps. Thus, considering the pixels in the gaps, the CIS system makes a black line inconspicuous by correcting error pixels brought about by noise or the like on the document reading position (see Japanese Patent Laid-Open No. 2004-193742, for example).

When using the CIS sensor, the pixel data output from the sensor units are not output successively, but output discretely block by block, each consisting of a plurality of photosensitive chips. For example, in the case of the CIS sensor which is constructed as a line sensor using 11 photosensitive chips and which outputs the pixel data by dividing it into four blocks, the pixel data divided into four blocks are output in parallel from four discrete positions on a single main scanning line. Accordingly, to correct the black line caused by the noise or the like adhering to a position at a boundary between the blocks (referred to as "pixel data output blocks" from now on) in the conventional technique, the pixel data must be retained temporarily in the line buffer so as to eliminate the influence of the input timing of the pixel data. Otherwise, information on the neighboring pixels across the blocks cannot be obtained, which presents a problem of being unable to correct the error pixels at the boundaries by the conventional correcting method.

SUMMARY OF THE INVENTION

According to an aspect of the present invention, an image processing device is capable of correcting error pixels without using a line buffer even in the case where a reading optical system uses an image sensor such as a CIS sensor with a structure having a plurality of sensors arranged in series.

According to another aspect of the present invention, an image processing device includes: an image reading component configured to read an original document image with a plurality of image sensors arranged in series, and to divide pixel signals corresponding to one main scanning line read out into N blocks, and outputs output pixel signals corresponding to one main scanning line by outputting data from each of the N blocks; a detecting component configured to detect presence or absence of a factor of black line on a platen or white board from the pixel signals output from the image reading component; and a series of error pixel correcting processing components each configured to receive the data from a corresponding block among the data output from the N blocks by the image reading component, and to correct error pixels brought about by the factor of black line the detecting component detects. When the detecting component detects the factor of black line at a boundary between a Kth block and a (K−1)th block of the N blocks, the Kth error pixel correcting processing component notifies the (K−1)th error pixel correcting processing component of neighboring pixel information about the error pixels, and the (K−1)th error pixel correcting processing component corrects the error pixels at the boundary in response to the neighboring pixel information notified and the data from the (K−1)th block.

According to another aspect of the present invention, an image processing device includes: an image reading component configured to read an original document image with a plurality of image sensors arranged in series, and to divide pixel signals corresponding to one main scanning line read out into N blocks, and outputs output pixel signals corresponding to one main scanning line by outputting data from each of the N blocks; a detecting component configured to detect presence or absence of a factor of black line on a platen or white board from the pixel signals output from the image reading component; and a series of error pixel correcting processing components each configured to receive the data from a corresponding block among the data output from the N blocks by the image reading component, and to correct error pixels brought about by the factor of black line the detecting component detects. The Kth error pixel correcting processing component notifies the (K−1)th error pixel correcting processing component of boundary neighboring pixel information on a boundary between a Kth block and a (K−1)th block of the N blocks, and the (K−1)th error pixel correcting processing component corrects the error pixels at the boundary in response to the boundary neighboring pixel information notified and the data from the (K−1)th block.

According to another aspect of the present invention, an image processing method uses an image reading component, a detecting component, a Kth error pixel correcting processing component and a (K−1) the error pixel correcting processing component, and comprises: an outputting step in which the image reading component reads out an original document image with a plurality of image sensors arranged in series, divides pixel signals corresponding to one main scanning line read out into N blocks, and outputs output pixel signals corresponding to one main scanning line by outputting data from each of the N blocks; a detecting step in which the detecting component detects presence or absence of a factor of black line on a platen or white board from the pixel signals output from the image reading component; and an error pixel correcting step in which the Kth error pixel correcting processing component receives the data from Kth block among the data output from the N blocks by the image reading component, and corrects error pixels brought about by the factor of black line that the detecting component detects. The error pixel correcting step comprises, when the detecting component detects the factor of black line at a boundary between a Kth block and a (K−1)th block of the N blocks: a step in which the Kth error pixel correcting processing component notifies the (K−1)th error pixel correcting processing component of neighboring pixel information about the error pixels; and a step in which the (K−1)th error pixel correcting processing component corrects the error pixels at the boundary in response to the neighboring pixel information notified and the data from (K−1)th block.

According to another aspect of the present invention, an image processing method uses an image reading component, a detecting component, a Kth error pixel correcting processing component, and a (K−1)th error pixel correcting processing component, and includes: an outputting step in which the image reading component reads out an original document image with a plurality of image sensors arranged in series, and divides pixel signals corresponding to one main scanning line read out into N blocks, and outputs output pixel signals corresponding to one main scanning line by outputting data from the N blocks; a detecting step in which the detecting component detects presence or absence of a factor of black line on a platen or white board from the pixel signals output from the image reading component; and an error pixel correcting step in which the Kth error pixel correcting processing component receives the data from Kth block among the data output from the N blocks by the image reading component, and corrects error pixels brought about by the factor of black line the detecting component detects. The error pixel correcting step comprises: a step in which the Kth error pixel correcting processing component notifies the (K−1) th error pixel correcting processing component of boundary neighboring pixel information on a boundary between the Kth block and a (K−1)th block of the N blocks; and a step in which the (K−1)th error pixel correcting processing component corrects the error pixels at the boundary in response to the boundary neighboring pixel information notified and the data from the (K−1)th block.

According to another aspect of the present invention, a computer readable storage medium records a program for causing a computer to execute at least one the foregoing image processing methods.

According to another aspect of the present invention, an image processing device can correct the error pixels without using a line buffer even in the case of using an image sensor such as a CIS sensor with a structure having a plurality of sensors arranged in series in a reading optical system, thereby being able to reduce the circuit scale. This makes it possible to restrict the chip size, and to reduce the cost of the chip.

Further features of the present invention will become apparent from the following description of exemplary embodiments (with reference to the attached drawings).

DESCRIPTION OF THE EMBODIMENTS

<External Appearance of Copying Machine>

Figure 1:
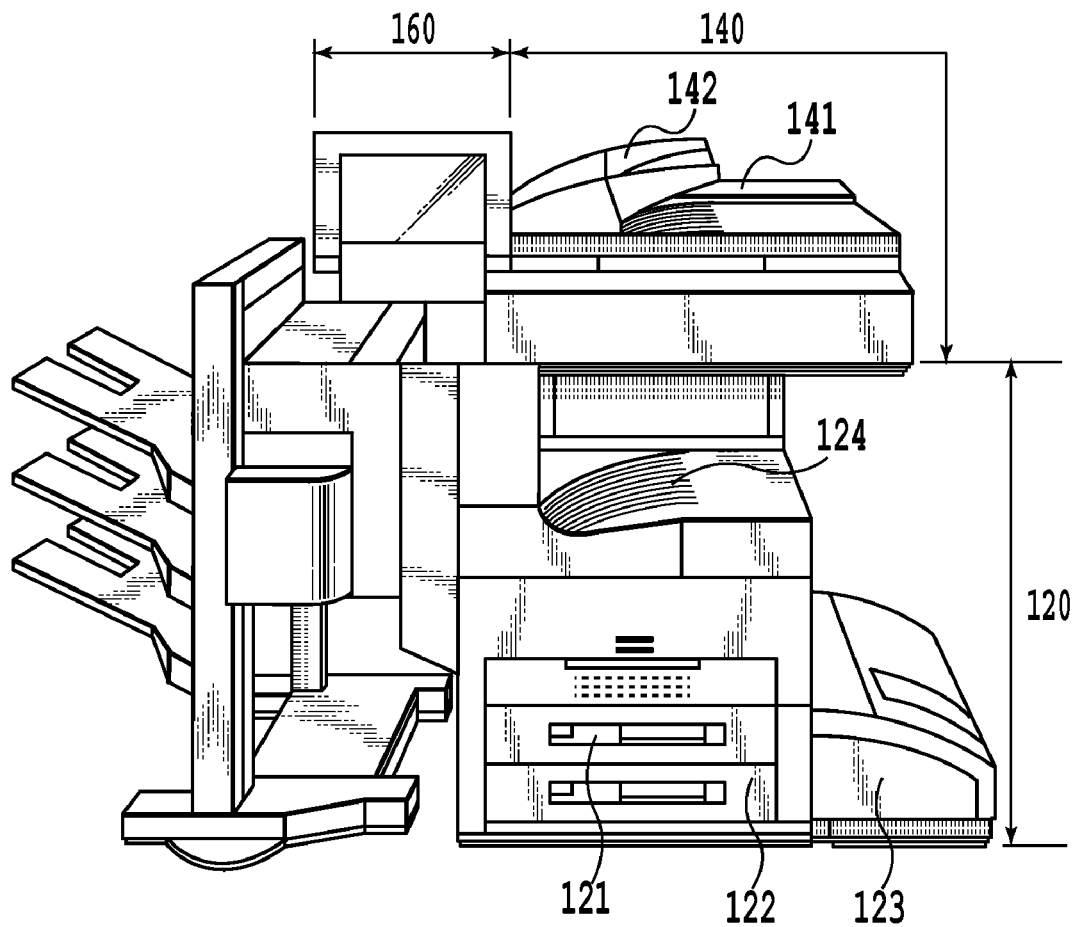
FIG. 1 is a diagram showing an exterior view of a copying machine.

FIG. 1 is a diagram showing an exterior view of a copying machine in a first embodiment of the present invention.

A scanner 140, or an image reading unit, converts image information to an electric signal by inputting to an image sensor (CIS sensor) the reflected light obtained by exposure scanning of an image on an original document with emission of an LED (Light Emitting Diode). The scanner 140 further converts the electric signal to luminance signals comprising RGB colors, and outputs the luminance signals to a controller 200 (see FIG. 3) as image data.

Original documents are set on a tray 142 of a document feeder 141. When a user instructs to start reading via an operating unit 160, the controller 200 delivers an original document reading instruction to the scanner 140. Receiving the instruction, the scanner 140 feeds original documents one after another from the tray 142 of the document feeder 141 to carry out reading operation of the original documents.

A printer 120 is an image forming device for forming the image data it receives from the controller 200 on paper.

The image forming system in the present embodiment is an electrophotographic system employing a photoconductive drum or photoconductive belt. In addition, the printer 120 has a plurality of paper cassettes 121, 122, and 123 capable of coping with different paper sizes or different paper directions. After printing, papers are ejected to a paper output tray 124.

<Copying Machine—Scanner>

Figure 2:
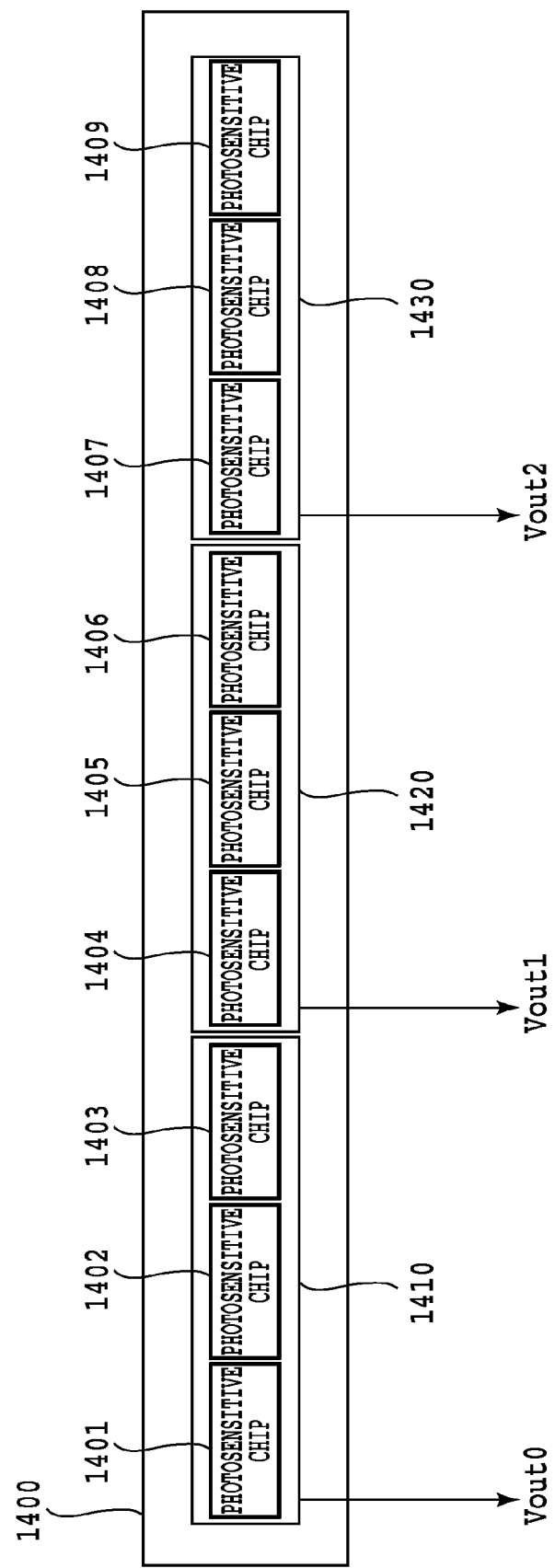
FIG. 2 is a view showing a structure of a CIS sensor.

FIG. 2 is a view showing a structure of a CIS sensor 1400 used in the scanner 140.

The CIS sensor 1400 is a line image sensor having nine photosensitive chips 1401-1409 arranged in series. The photosensitive chips 1401-1409 are divided into N pixel output blocks. Thus, the CIS sensor 1400 outputs pixel signals corresponding to one main scanning line in parallel in N divisions. In the present embodiment, the pixel signals corresponding to one main scanning line are output in three pixel output blocks. More specifically, the photosensitive chips 1401-1403 correspond to a pixel output block 1410, the photosensitive chips 1404-1406 correspond to a pixel output block 1420, and the photosensitive chips 1407-1409 correspond to a pixel output block 1430.

The pixel output block 1410 outputs a pixel signal Vout0, the pixel output block 1420 outputs a pixel signal Vout1, and the pixel output block 1430 outputs a pixel signal Vout2. The pixel signals Vout0, Vout1, and Vout2 each become RGB pixel signals by respectively controlling the quantity of Red light, Green light, and Blue light output by one or more light sources. For example, in an LED display, each pixel may have a respective Red LED, Green LED, and Blue LED that are respectively controlled by the pixel signals Vout0, Vout1, and Vout2. As another example, a screen may be scanned by each of a Red laser Diode, Green laser Diode, and Blue laser Diode respectively controlled by the pixel signals Vout0, Vout1, and Vout2. The present invention is not limited to any particular type of display.

In addition, the pixel signals are converted into digital data through an A/D converter (not shown), and are supplied to the controller 200.

<Copying Machine—Controller>

Figure 3:
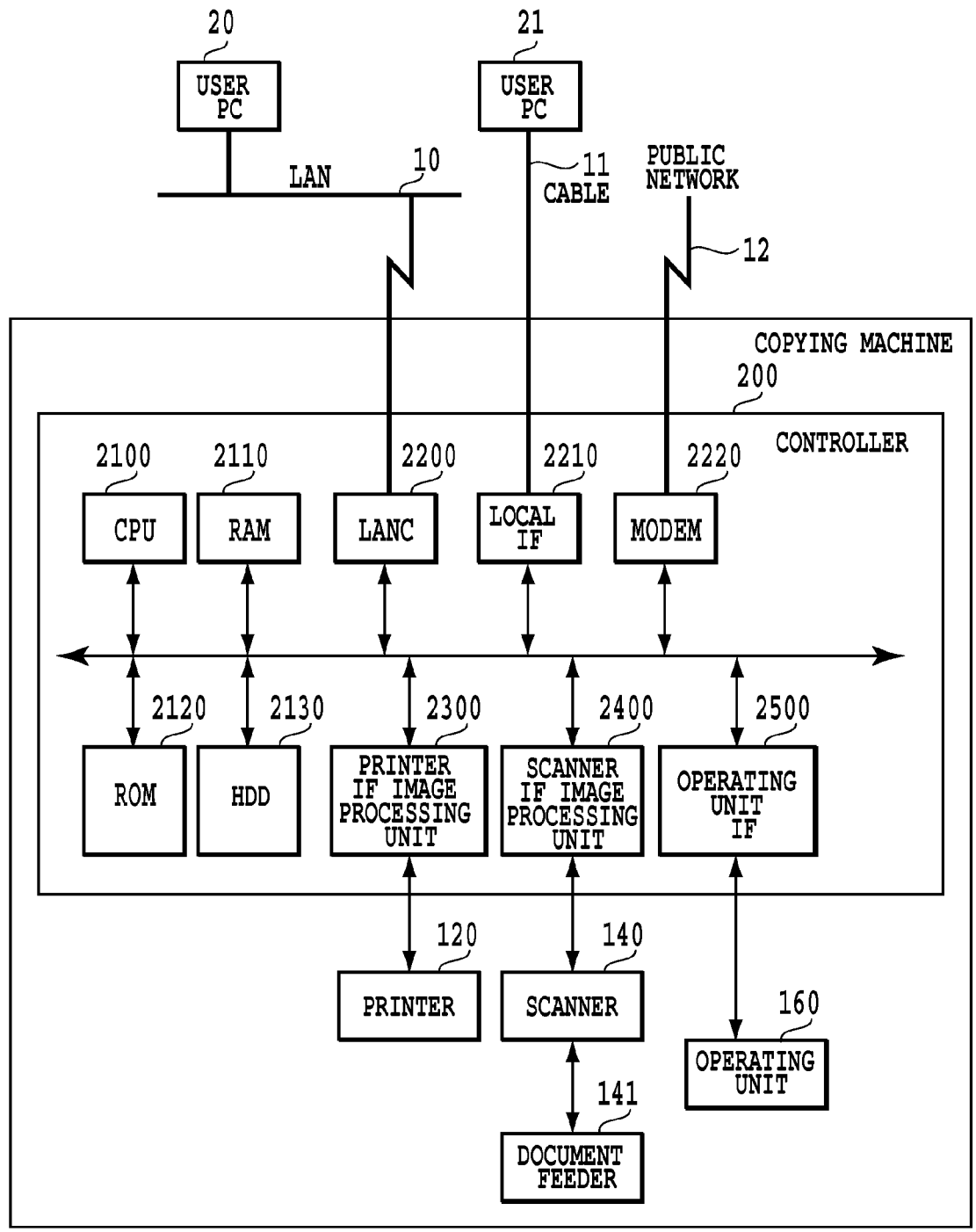
FIG. 3 is a block diagram showing a configuration of a controller.

FIG. 3 is a block diagram showing a hardware configuration of the copying machine in the present embodiment, and particularly showing a configuration of the controller in detail.

The controller 200 is connected to the scanner 140 which is an image input device, to the printer 120 which is an image output device, and to a LAN 10 and a public network (WAN) 12. The controller 200 carries out overall control of the operation of the copying machine together with the input/output control of the image information and device information.

A CPU 2100, a processor for controlling the copying machine in its entirety, collectively controls access to or from various devices connected thereto according to control programs stored in a ROM 2120. In addition, the CPU 2100 collectively controls various processing executed inside the controller 200. A RAM 2110, which serves as a system work memory, also works as an image memory for temporarily storing the image data. The ROM 2120 is a boot ROM for storing a boot program of the system. An HDD 2130, a hard disk drive, mainly stores information (system software) necessary for starting the computer and the image data. The data can be stored not only into the HDD 2130 but also into a storage medium capable of retaining its contents after the power is turned off.

A LANC (LAN controller) 2200 is connected to the LAN 10, and carries out between it and a user PC 20 the input/output of the output image data and the input/output of information about device control. A local interface 2210, which is a USB or Centronics interface, is connected to a user PC 21 or a printer via a cable 11 and carries out input/output of data. A MODEM 2220 is connected to a public network 12 and performs the input/output of data. A printer interface image processing unit 2300 is connected to the printer 120 and performs communication with a CPU included in the printer 120. The printer interface image processing unit 2300 also performs image processing for conversion between synchronous/asynchronous modes of the image data and for print output. A scanner interface image processing unit 2400 is connected to the scanner 140 and performs communication with a CPU included in the scanner 140. The scanner interface image processing unit 2400 also performs conversion between the synchronous/asynchronous modes of the image data and the image processing such as error pixel correcting processing which will be described below. An operating unit interface 2500 is an interface for supplying the image data to be displayed on the operating unit 160 from the controller 200 to the operating unit 160, and for supplying the information a user of the copying machine inputs from the operating unit 160 to the controller 200.

<Copying Machine—Operating Unit>

Figure 4:
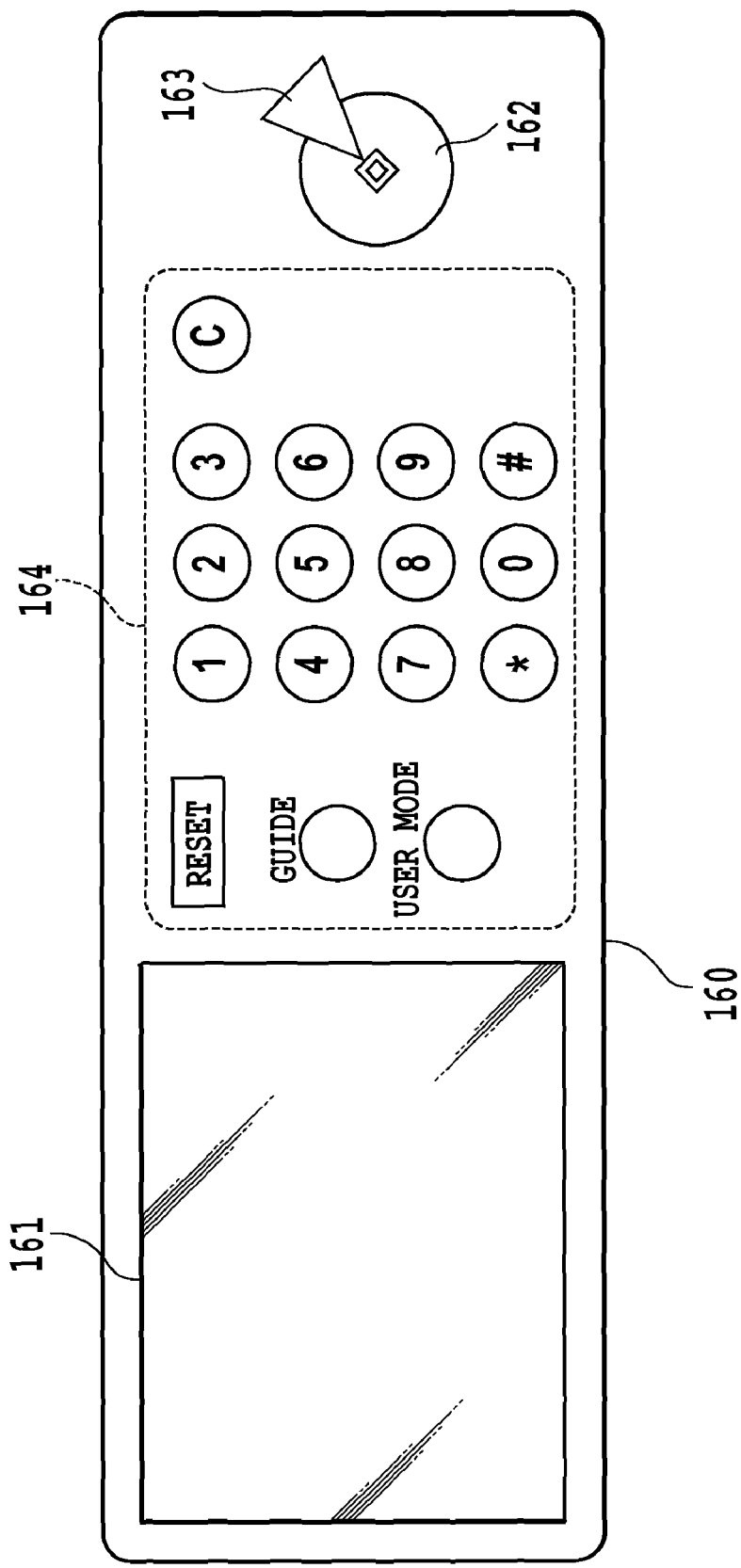
FIG. 4 is a diagram showing a structure of an operating unit.

FIG. 4 is a diagram showing a structure of the operating unit 160.

A liquid crystal operation panel 161, which is a combination of a liquid crystal and a touch panel, displays an operation screen, and delivers information about pushing of displayed keys by the user to the controller 200. A start key 162 is used to start reading and printing operation of an original document image and to instruct start of other functions. The start key, which has a built-in two-color LED of green and red, indicates that the start is possible when the green is lit, and the start is impossible when the red is lit. A stop key 163 has a function of stopping the operation. A hard key group 164 includes a numeric keypad, a clear key, a reset key, a guide key and a user mode key.

<Scanner Interface Image Processing Unit>

Figure 5:
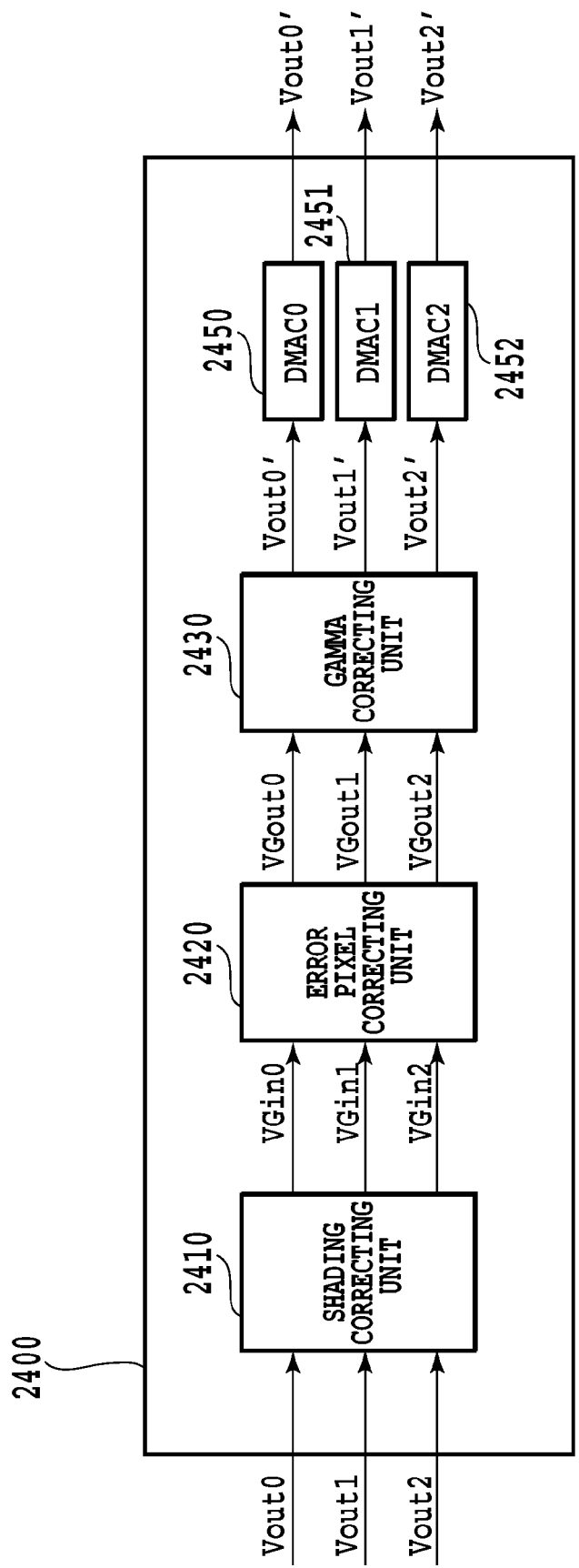
FIG. 5 is a block diagram showing a configuration of a scanner interface image processing unit.

FIG. 5 is a block diagram showing a configuration of a scanner interface image processing unit 2400.

As described above, noise, dusts, scratches, stain or the like on the document reading position can cause a black line. Although the following description takes a case where the cause of the black line is noise as an example, the present embodiment is also applicable to a case where the cause of the black line is other than noise.

A shading correcting unit 2410 receives the pixel signals Vout0, Vout1, and Vout2 that the scanner 140 outputs separately (see FIG. 2). The shading correcting unit 2410 applies correcting processing to luminance unevenness due to characteristics of the optical system and image system using a publicly known technique so as to acquire an image with uniform brightness, and outputs pixel signals (VGin0, VGin1, and VGin2) after the correcting processing to an error pixel correcting unit 2420.

The error pixel correcting unit 2420 detects, if noise adheres to a document reading position, the position of the noise, and carries out the correcting processing for making inconspicuous the black line in the read image caused by the noise. More specifically, using normal pixels in the neighborhood of the error pixels in the image region affected by the noise (referred to as "neighboring pixels"hereinafter), the error pixel correcting unit 2420 applies the correcting processing to the error pixels, and outputs the pixel signals (VGout0, VGout1, and VGout2) after the correcting processing to a gamma correcting unit 2430. The detailed configuration and operation of the error pixel correcting unit 2420 will be described below.

The gamma correcting unit 2430 corrects the difference in color characteristics between the reading elements and the device using the publicly known technique, and outputs the pixel signals (VGout0', VGout1', and VGout2') after the correction to DMAC0, DMAC1, and DMAC2 (2450, 2451 and 2452) constituting a DMA controller.

The DMAC0, DMAC1 and DMAC2 write the pixel data (Vout0', Vout1', and Vout2'), which the gamma correcting unit 2430 outputs, into the image memory (RAM 2110 of FIG. 3) directly without passing through the CPU. Generally, the scanner interface image processing unit 2400 has N DMACs, and a Kth DMA controller (DMACK) writes the pixel data, corresponding to Kth pixel signal among the N pixel signals output, separately into the RAM 2110, where K<=N. In the present embodiment, the DMAC0, DMAC1, and DMAC2 write the pixel data (Vout0', Vout1', and Vout2') into the storage regions in the image memory corresponding to the pixel signals (Vout0, Vout1, and Vout2) the scanner 140 outputs separately. Thus writing the pixel data into the storage regions preset in the image memory by the three DMACs results in forming the image data of one page on the image memory. In addition, in the present embodiment, the processing is also performed of replacing (rewriting) pixel data written on the RAM 2110 by a particular DMAC by another pixel data by another DMAC. The processing is associated with the error pixel correcting processing, and its details will be described below.

<Error Pixel Correcting Unit>

Figure 6:
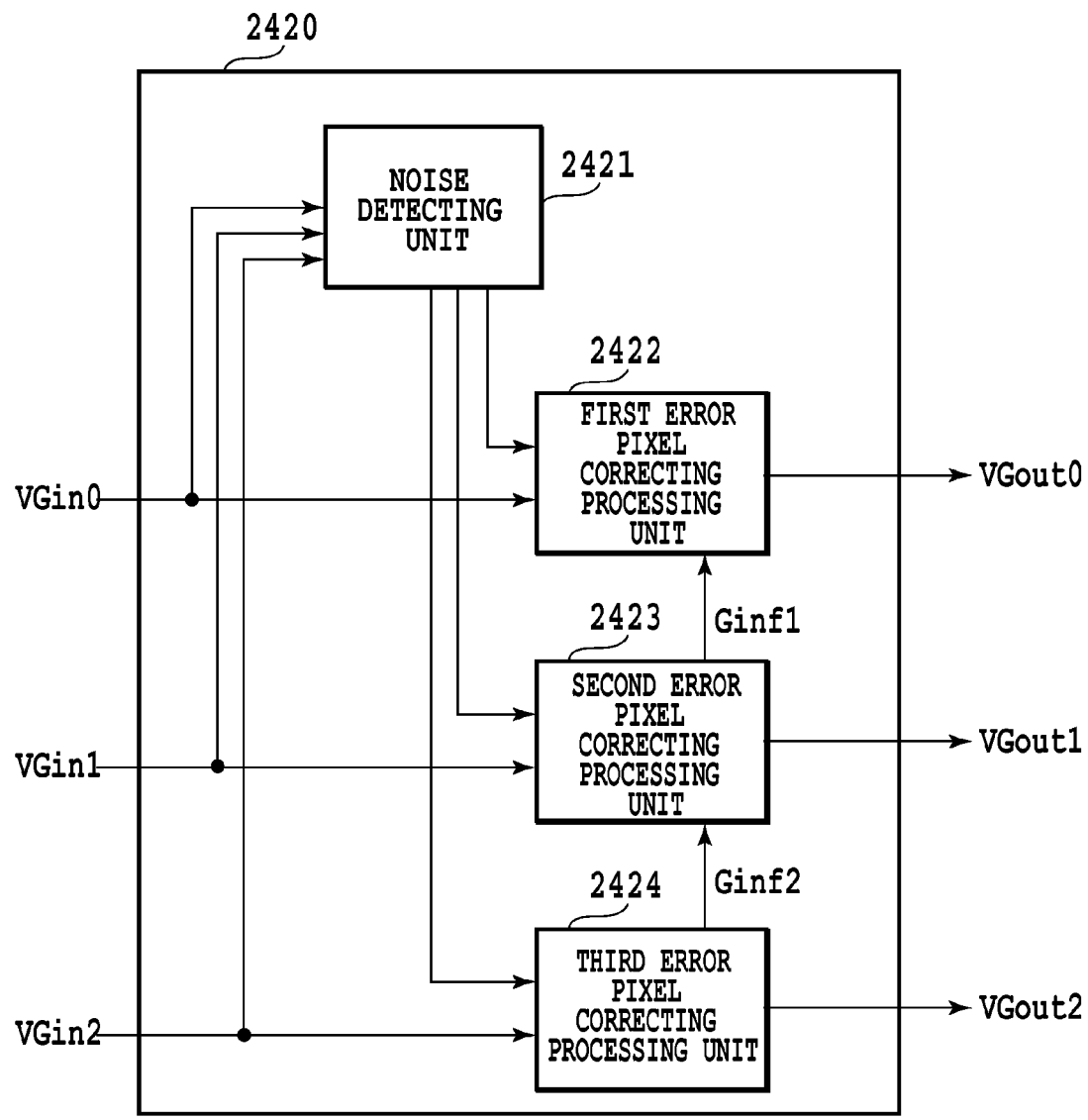
FIG. 6 is a block diagram showing a configuration of an error pixel correcting unit.

FIG. 6 is a block diagram showing a configuration of the error pixel correcting unit 2420.

The error pixel correcting unit 2420 includes a noise detecting unit and N error pixel correcting processing units, in general. Since the present embodiment is described by way of example where noise is a factor of black line, the error pixel correcting unit 2420 has a noise detecting unit 2421 for detecting whether the noise is present or not on a platen or white board. In addition, since the pixel signals are output separately from the scanner in the three pixel output blocks in the present embodiment, the error pixel correcting unit 2420 has three error pixel correcting processing units (2422-2424). The reference numeral 2422 designates a first error pixel correcting processing unit, 2423 designates a second error pixel correcting processing unit, and 2424 designates a third error pixel correcting processing unit.

First, the processing the noise detecting unit 2421 executes will be described.

The noise detecting unit 2421 detects whether the noise adheres to the document reading position or not. The noise detecting unit 2421 receives the pixel signals (VGin0, VGin1 and VGin2) passing through the shading correction by the shading correcting unit 2410. Then, the noise detecting unit 2421 performs filtering processing of the pixel signals to emphasize their high-frequency components, followed by digitization of the pixel signals using a black decision threshold.

Figure 7:
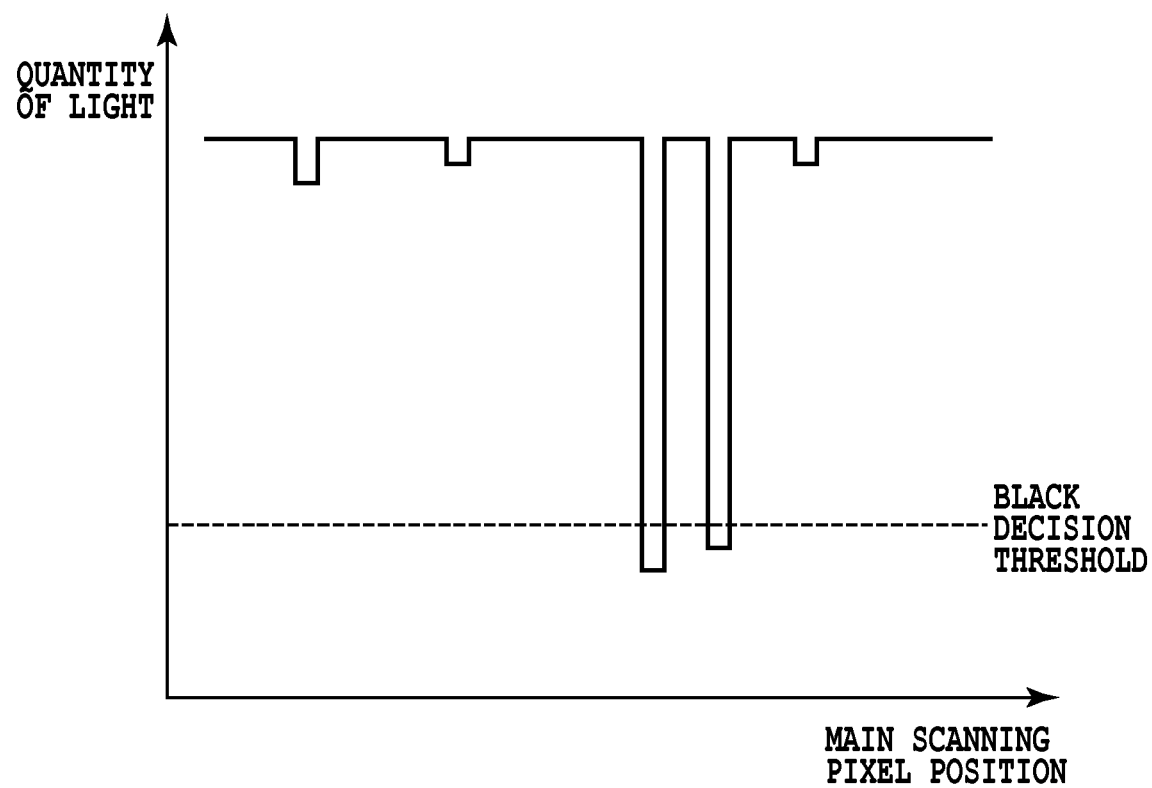
FIG. 7 is a diagram for explaining digitization using a black decision threshold.

FIG. 7 is a diagram for explaining the digitization by the noise detecting unit 2421 using the black decision threshold.

In FIG. 7, the vertical axis of the graph indicates the light level of the pixel signal after the filtering processing, and the horizontal axis indicates the main scanning pixel position. As can be seen from the graph, the light level varies in accordance with the main scanning pixel position. The noise detecting unit 2421 compares the light level with the black decision threshold at all the main scanning pixel positions. As a result of the comparison, the noise detecting unit 2421 sets "1" to a pixel whose light level is under the black decision threshold, and sets "0" to a pixel whose light level exceeds the black decision threshold. Thus, pixels with low light levels are assigned "1", and pixels with high light levels are assigned "0". Next, the set values ("0" or "1") are accumulated several lines in the subscanning direction for respective main scanning pixel positions, and the accumulated values are compared with a prescribed noise decision level to make a decision as to whether noise is present or not. Next, if the noise detecting unit 2421 makes a decision that the noise is present, it detects the position of the noise in the main scanning direction and the width of the noise. The position of the noise and the width of the noise detected are delivered as the noise information to the error pixel correcting processing units 2422-2424 which will be described below.

Figure 8:
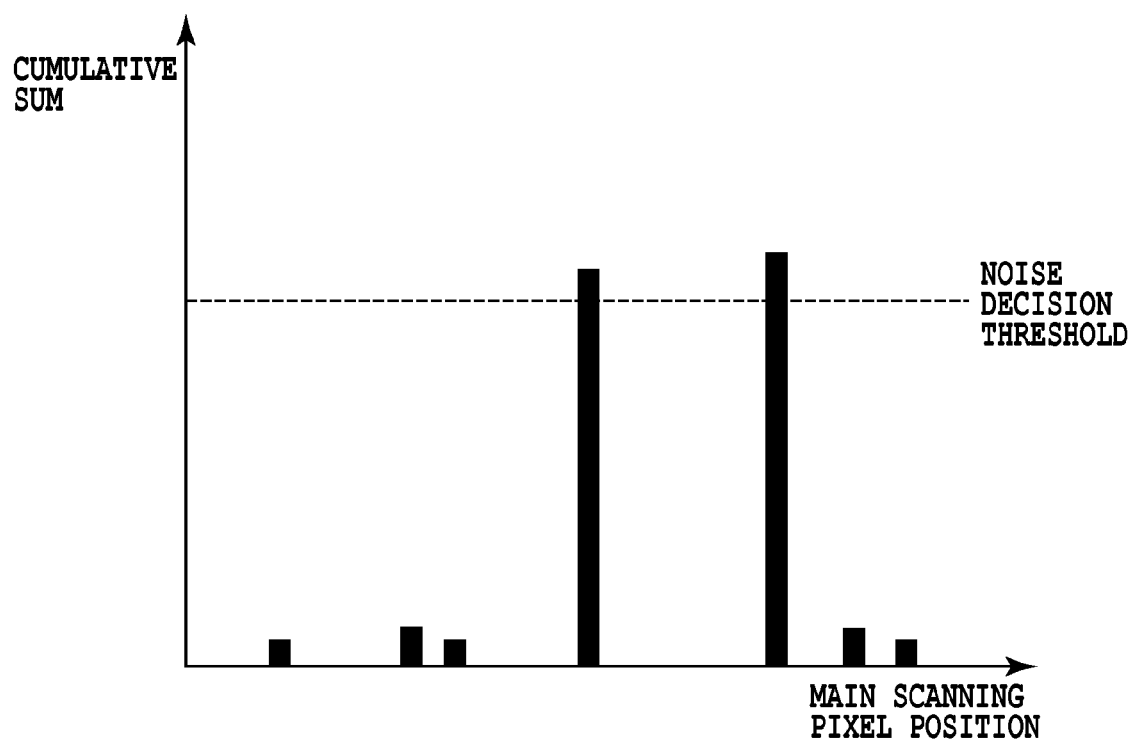
FIG. 8 is a diagram for explaining a noise decision.

FIG. 8 is a diagram for explaining the noise decision.

In FIG. 8, the vertical axis of the graph indicates the accumulated value, and the horizontal axis represents the main scanning pixel position.

It is found from FIG. 8 that the accumulated value exceeds the noise decision level at two main scanning pixel positions. Accordingly, the noise detecting unit 2421 makes a decision that the noise is present at the two positions.

Here, another configuration is also possible which sets two black decision thresholds, and which assigns "1" to pixels having the light levels between the two. In addition, the noise detecting processing is generally carried out either at the start or end of a reading job or during non-reading intervals of the original documents between the original documents.

Next, with reference to FIG. 6, the processing the error pixel correcting processing units 2422-2424 execute will be described.

The three error pixel correcting processing units (2422-2424) receive the three pixel signals (VGin0, VGin1, and VGin2) undergoing the shading correction by the shading correcting unit 2410 and the noise information that the noise detecting unit 2421 outputs. Generally, the Kth error pixel correcting processing unit receives the Kth pixel signal among the N-divided pixel signals, where K<=N. Accordingly, in the present embodiment, the first error pixel correcting processing unit 2422, the second error pixel correcting processing unit 2423, and the third error pixel correcting processing unit 2424 receive VGin0, VGin1, and VGin2, respectively.

The error pixel correcting processing units (2422-2424) interchange the information about normal pixels in the neighborhood of error pixels (referred to as "neighboring pixel information" from now on) at the boundaries between the pixel output blocks of the CIS sensor. More specifically, if the noise is detected at the boundary between the Kth and (K−1) th division outputs, the Kth error pixel correcting processing unit notifies the (K−1)th error pixel correcting processing unit of the neighboring pixel information about the error pixels. In the present embodiment, the third error pixel correcting processing unit 2424 notifies the second error pixel correcting processing unit 2423 of the neighboring pixel information Ginf2 at the boundary between the pixel output blocks (at the boundary in the main scanning region between the outputs Vout1 and Vout2 of the CIS sensor). In addition, the second error pixel correcting processing unit notifies the first error pixel correcting processing unit of the neighboring pixel information Ginf1 at the boundary between the pixel output blocks (at the boundary in the main scanning region between the outputs Vout0 and Vout1 of the CIS sensor). The notification of the neighboring pixel information is made only when the neighboring pixel information cannot be acquired from VGin. Here, the range of the block boundary to be notified is determined by the width of the noise and becomes a range of (maximum width of noise+1) pixels. For example, when the maximum width of the noise is six pixels, the range of the block boundary to be notified becomes up to seven pixels from the boundary of the block at the maximum. The error pixel correcting processing units (2422-2424) interchange the neighboring pixel information so that they can correct the error pixels caused by the noise regardless of the manner in which the noise adheres to the boundary between the pixel output blocks.

Although the present embodiment is configured in such a manner that the neighboring pixel information is retained within the error pixel correcting processing units (2422-2424), another configuration is also possible which retains it outside the error pixel correcting processing units (2422-2424).

In the present embodiment, although the noise detecting unit 2421 and the error pixel correcting processing units (2422-2424) are implemented by hardware, they can be configured by software that implements the functions of the noise detecting processing and the error pixel correcting processing.

<Error Pixel Correcting Processing Unit>

Figure 9:
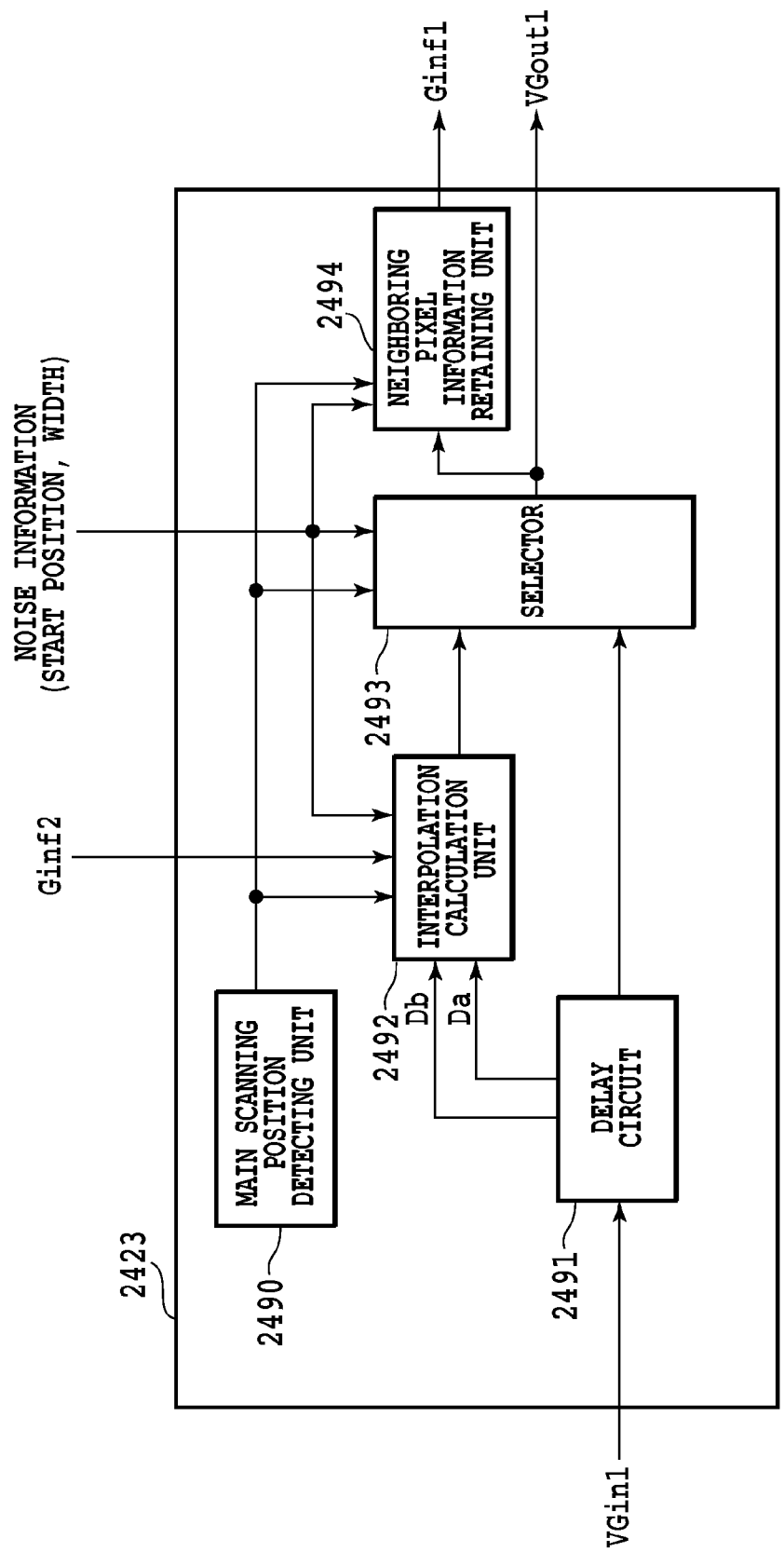
FIG. 9 is a block diagram showing a configuration of an error pixel correcting processing unit.

FIG. 9 is a block diagram showing a configuration of the error pixel correcting processing unit.

Basically, the first error pixel correcting processing unit 2422, second error pixel correcting processing unit 2423, and third error pixel correcting processing unit 2424 have the same configuration. So, the configuration of the second error pixel correcting processing unit 2423 will be described as an example.

A main scanning position detecting unit 2490 detects the position of the pixel subjected to the processing presently in the main scanning direction. The main scanning position detecting unit 2490 is chiefly composed of a counter for counting the number of neighboring pixels in the main scanning direction.

A delay circuit 2491 is a circuit for delaying the pixel signal VGin1 input to the second error pixel correcting processing unit 2423. By establishing correspondence between the amount of delay and the maximum width of noise, an interpolation calculation unit 2492, which will be described below, becomes able to acquire the neighboring pixel information Da at the left edge of the noise and the neighboring pixel information Db at the right edge, which are necessary for the interpolation calculation, at appropriate timing. Besides, the delay circuit 2491 can increase the amount of delay due to other factors. For example, there is sometimes difference between the pixel output rate of the scanner 140 and the pixel processing rate within the scanner interface image processing unit 2400. In such a case, the delay circuit not only delays the input pixel signal VGin1, but also performs the delay control considering an enabled state of the input neighboring pixels. In addition, after the input of all the neighboring pixels from the VGin1 in the main scanning direction has been completed, the delay circuit controls the output of all the neighboring pixels so that none of the neighboring pixels are left behind without being output.

The interpolation calculation unit 2492 performs linear interpolation on the error pixels. The interpolation calculation unit 2429 compares the position of the pixel being processed received from the main scanning position detecting unit 2490 with the noise information received from the noise detecting unit 2421. Then the interpolation calculation unit 2429 carries out the linear interpolation when it makes a decision that the pixel being processed is an error pixel. Here, the noise information includes the occurrence start position of the error pixels in the main scanning direction and the noise width information. The linear interpolation processing is performed using the neighboring pixel information on both ends of the noise. Accordingly, unless the noise is placed on the boundary between the blocks of the sensor output, the interpolation calculation unit 2429 carries out the linear interpolation using the neighboring pixel information Da and Db at both ends of the noise the delay circuit 2491 can acquire. In contrast, if the noise is placed on the boundary between the blocks of the sensor output, it sometimes occurs that the neighboring pixel information Db at the right edge of the noise cannot be obtained from the delay circuit 2491 (from VGin1). In this case, the interpolation calculation unit 2492 carries out the linear interpolation using the neighboring pixel information Ginf2 fed from the adjacent third error pixel correcting processing unit instead of Db.

The correcting processing will now be described in detail by way of example.

Figure 10:
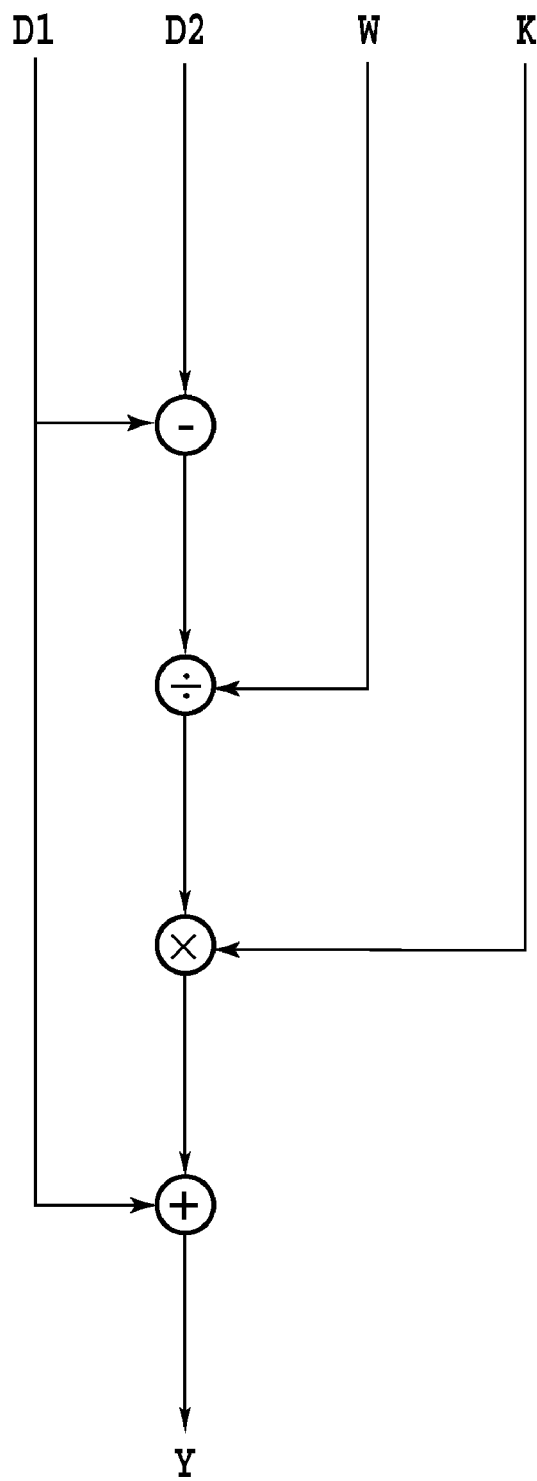
FIG. 10 is a diagram for explaining an example of interpolation calculation.

FIG. 10 is a diagram for explaining an example of the interpolation calculation.

In FIG. 10, the reference symbol D1 denotes the neighboring pixel information on the left edge of the noise that will be referred to at the error pixel correction. The reference symbol D2 denotes the neighboring pixel information on the right edge of the noise that will be referred to at the error pixel correction. The reference symbol W denotes the width of the noise, and K denotes the pixel position from the start position of the error pixel correction. The interpolation calculation result Y is obtained by the following expression.

$$Y = D1 + K/W \times (D2 - D1)$$

where the number of the input noise information is assumed to be present by the number of the noise adhering to.

As for the correcting processing of the error pixels, instead of the foregoing interpolation calculation, a more simplified method can be used which replaces the error pixels with the pixels identical to the neighboring pixel.

A selector 2493 selects and outputs either the pixel received from the delay circuit 2491 or the pixel from the interpolation calculation unit 2492 in response to the noise information (the occurrence start position of the error pixels in the main scanning direction and the noise width information) received from the noise detecting unit 2421. For example, unless the position of the pixel being processed indicated by the output signal of the main scanning position detecting unit 2490 is the position of the error pixels, the selector 2493 outputs the pixel received from the delay circuit 2491 as VGout1. In contrast, if the position of the pixel being processed is the position of the error pixels, the selector 2493 outputs the pixel received from the interpolation calculation unit 2492 as VGout1. As for the error pixels at the pixel output block boundary at the initial position of the processing, since they are not subjected to the correction, the selector 2493 outputs the pixel received from the delay circuit 2491 as VGout1.

A neighboring pixel information retaining unit 2494 holds the neighboring pixel information Ginf1 in order to transfer the neighboring pixel information on the pixel output block boundary from the second error pixel correcting processing unit 2423 to the first error pixel correcting processing unit 2422. In this case, if a decision is made that the error pixels are present in the range of the boundary between the pixel output blocks, it 2494 retains the neighboring pixel information Ginf1, and it 2494 notifies the first error pixel correcting processing unit 2422 of the neighboring pixel information Ginf1 in response to a request therefor. The first error pixel correcting processing unit 2422 carries out the correcting processing of the error pixels in accordance with the neighboring pixel information if the noise adheres to the boundary between the pixel output blocks 1410 and 1420. The neighboring pixel information retaining unit 2494 compares the main scanning position indicated by the output of the main scanning position detecting unit with the noise information, and it 2494 identifies the neighboring pixels to be retained.

Up to this point, the description is made by way of example of the error pixel correcting processing unit 2423 under the assumption that it has the same configuration as the first error pixel correcting processing unit 2422 and the third error pixel correcting processing unit 2424. Actually, however, the first error pixel correcting processing unit 2422 can have a configuration of not retaining the neighboring pixel information because it is located at the leftmost section of the blocks of the CIS sensor. In addition, the third error pixel correcting processing unit 2424 can have a configuration of not accepting Ginf because it is located at the rightmost section of the blocks of the CIS sensor. In this case, if noise adheres to the left or right edge of a main scanning line, the third error pixel correcting processing unit 2424 may be configured so that the error pixels are replaced by the neighboring pixel closest to the error pixels.

<Error Pixel Correcting Processing>

Figure 11:
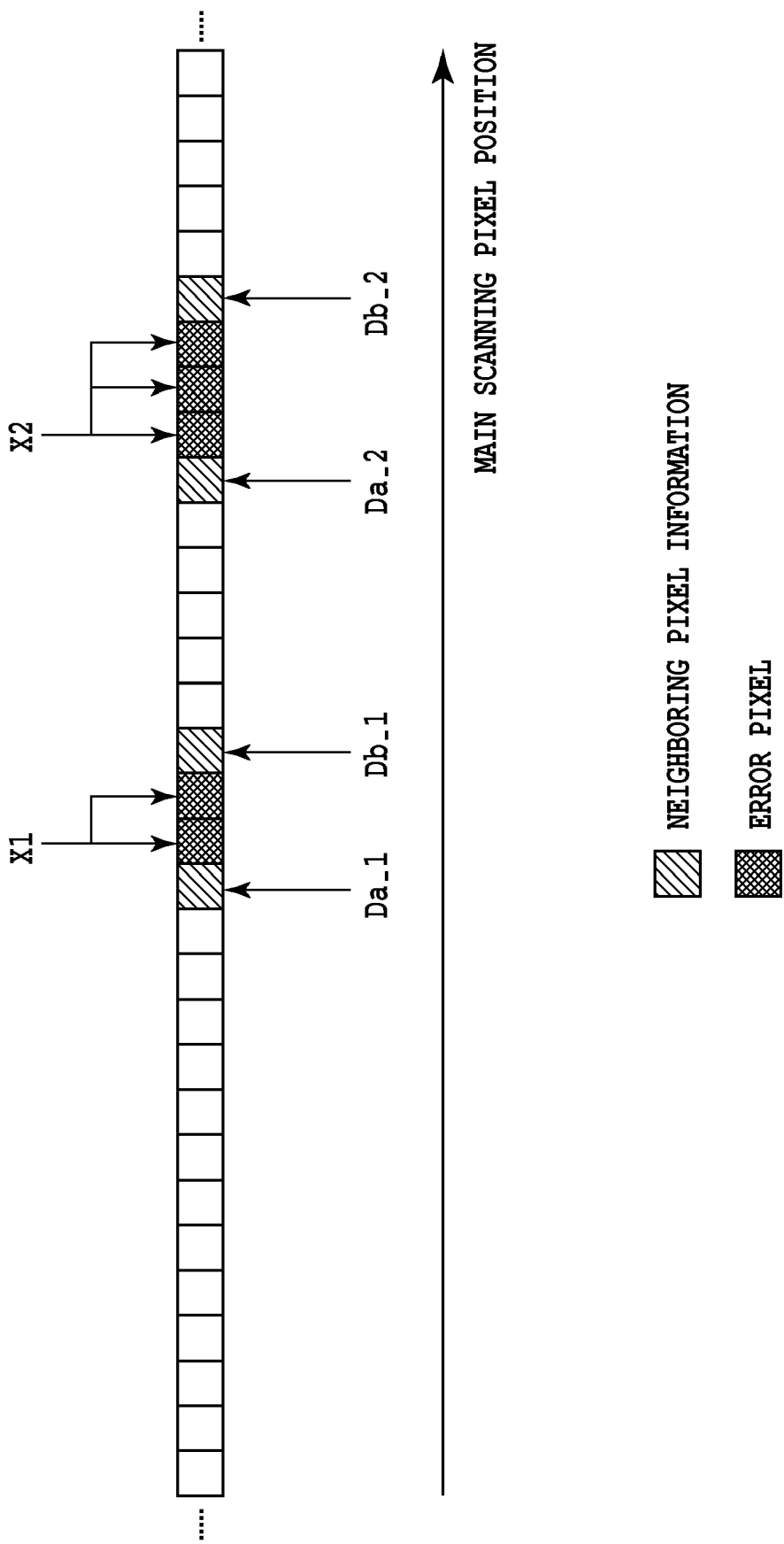
FIG. 11 is a diagram for explaining error pixel correcting processing.

FIG. 11 is a diagram for explaining the error pixel correcting processing.

In FIG. 11, the direction of the arrow indicates the main scanning direction. Each square represents a pixel. The reference symbol X1 designates first error pixels (2-pixel width) that the noise detecting unit 2421 detects, and X2 designates second error pixels (3-pixel width). In this case, the neighboring pixels necessary for the correcting processing of X1 are Da_1 and Db_1. Likewise, the neighboring pixels required for the correcting processing of X2 are Da_2 and Db_2.

Figure 12:
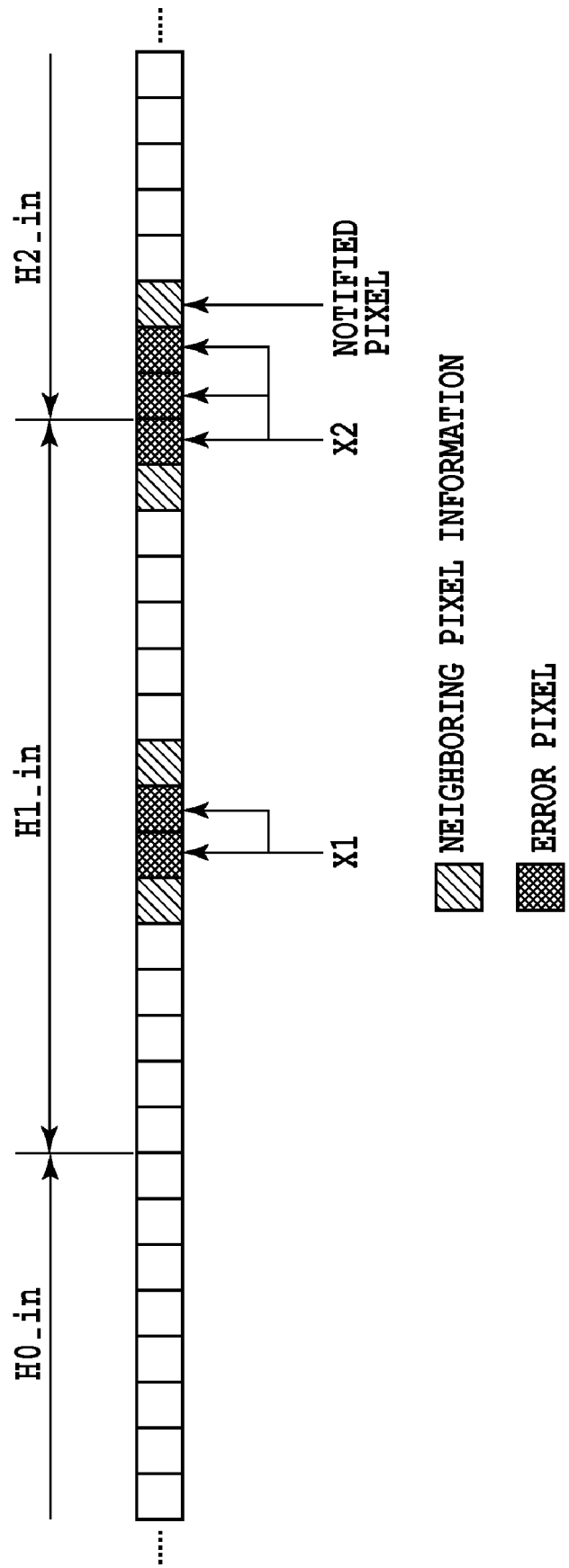
FIG. 12 is a diagram for explaining a boundary between pixel output blocks of a CIS sensor.

FIG. 12 is a diagram for explaining the boundary between the pixel output blocks of the CIS sensor.

In FIG. 12, H0_in denotes a pixel output range of the pixel output block 1410 shown in FIG. 2 (the pixel input range of the first error pixel correcting processing unit 2422). Thus, H0_in corresponds to the pixel signal Vout0 and the pixel signal VGin0. Likewise, H1_in corresponds to the pixel signal Vout1 and the pixel signal VGin1, and H2_in corresponds to the pixel signal Vout2 and the pixel signal VGin2.

Here, the error pixels X1 and their neighboring pixel are included in the pixel input range H1_in. Accordingly, the second error pixel correcting processing unit 2423 corrects the error pixels X1 using the neighboring pixel information Da_1 and Db_1 it acquires from the pixel signal VGin1. On the other hand, the error pixels X2 are located at the boundary between the pixel input range H1_in and the pixel input range H2_in. In this case, since the pixel signal VGin1 that the second error pixel correcting processing unit 2423 receives does not include the neighboring pixel information Db_2, it 2423 cannot execute the correcting processing with only the information given by the pixel signal VGin1. Likewise, since the pixel signal VGin2 the third error pixel correcting processing unit 2424 receives does not include the neighboring pixel information Da_2, it cannot execute the correcting processing with only the information given by the pixel signal VGin2. Such a condition is referred to as a "state in which the noise adheres to the boundary between pixel output blocks". In this case, the third error pixel correcting processing unit 2424 notifies the second error pixel correcting processing unit 2423 of the neighboring pixel information Db_2 as described above, which enables the second error pixel correcting processing unit 2423 to execute the correcting processing. Here, the neighboring pixel information Db_2 is always located near the initial position of the pixel input range H2_in. In contrast with this, the error pixels X2 are always located near the final position of the pixel input range H1_in. Accordingly, when the second error pixel correcting processing unit 2423 starts correction of the error pixels X2 (when the second error pixel correcting processing unit 2423 requests the neighboring pixel information), the neighboring pixel information Db_2 is retained in the third error pixel correcting processing unit 2424 as Ginf2.

Figure 13:
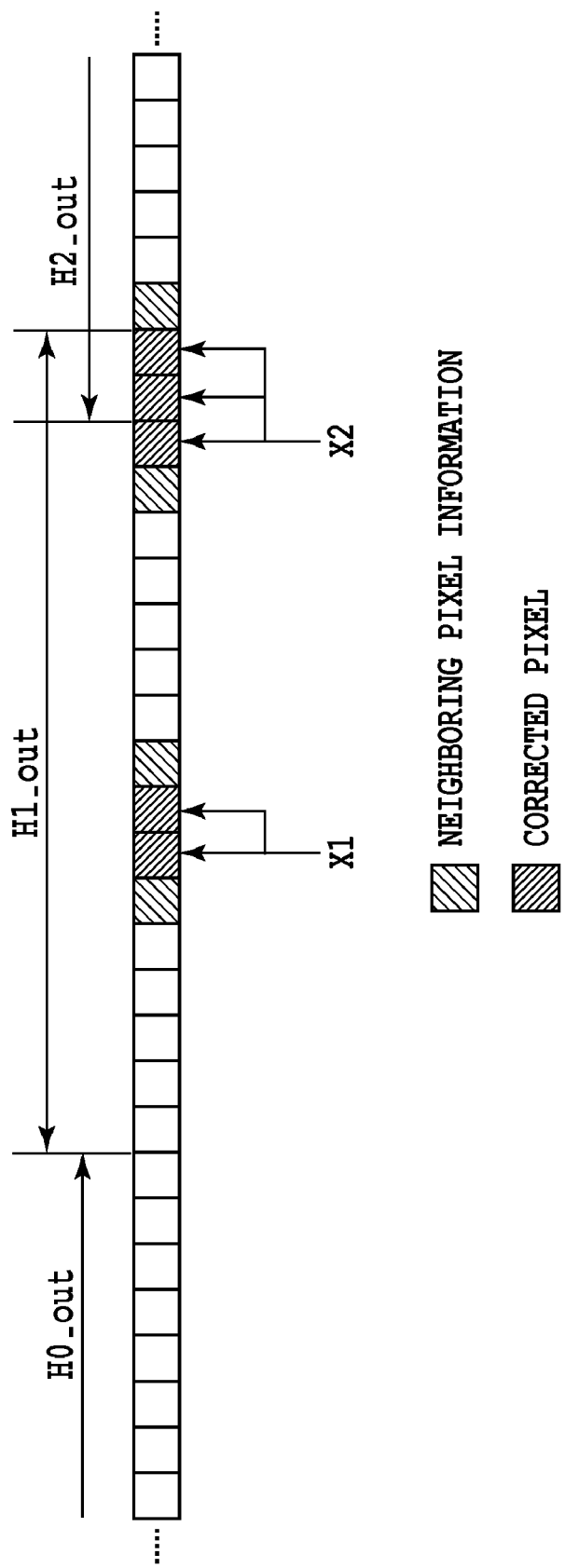
FIG. 13 is a diagram for explaining pixel output by the error pixel correcting processing unit.

FIG. 13 is a diagram for explaining the pixel output by the error pixel correcting processing unit.

In FIG. 13, the reference symbol H0_out designates the pixel output range of the first error pixel correcting processing unit 2422, H1_out designates the pixel output range of the second error pixel correcting processing unit 2423, and H2_out designates the pixel output range of the third error pixel correcting processing unit 2424. As can be seen from FIG. 13, the error pixels X1 and X2 are corrected and output. In this case, the width of the pixel output range H1_out exceeds that of the pixel input range H1_in shown in FIG. 12. This is because the second error pixel correcting processing unit 2423 corrects the error pixels X2 using the neighboring pixel information Db_2 notified by the third error pixel correcting processing unit 2424. Since the second error pixel correcting processing unit 2423 generates and outputs the corrected pixels with the same width as the width of the error pixels X2, the width of the pixel output range H1_out becomes wider. Thus, the third error pixel correcting processing unit 2424 outputs the error pixels X2 within the pixel output range H2_out as VGout2 without correcting them. Subsequently, the second error pixel correcting processing unit 2423 corrects the error pixel X2 within the pixel output range H1_out and outputs as VGout1.

The error pixels X2 the third error pixel correcting processing unit 2424 outputs without correcting are temporarily written on the image memory by the DMAC2 shown in FIG. 5. However, the error pixels X2 are overwritten on the image memory with the corrected pixels the second error pixel correcting processing unit 2423 outputs, that is, with the corrected pixels the DMAC1 outputs.

<Processing of DMAC (DMA Controller)>

Figure 14:
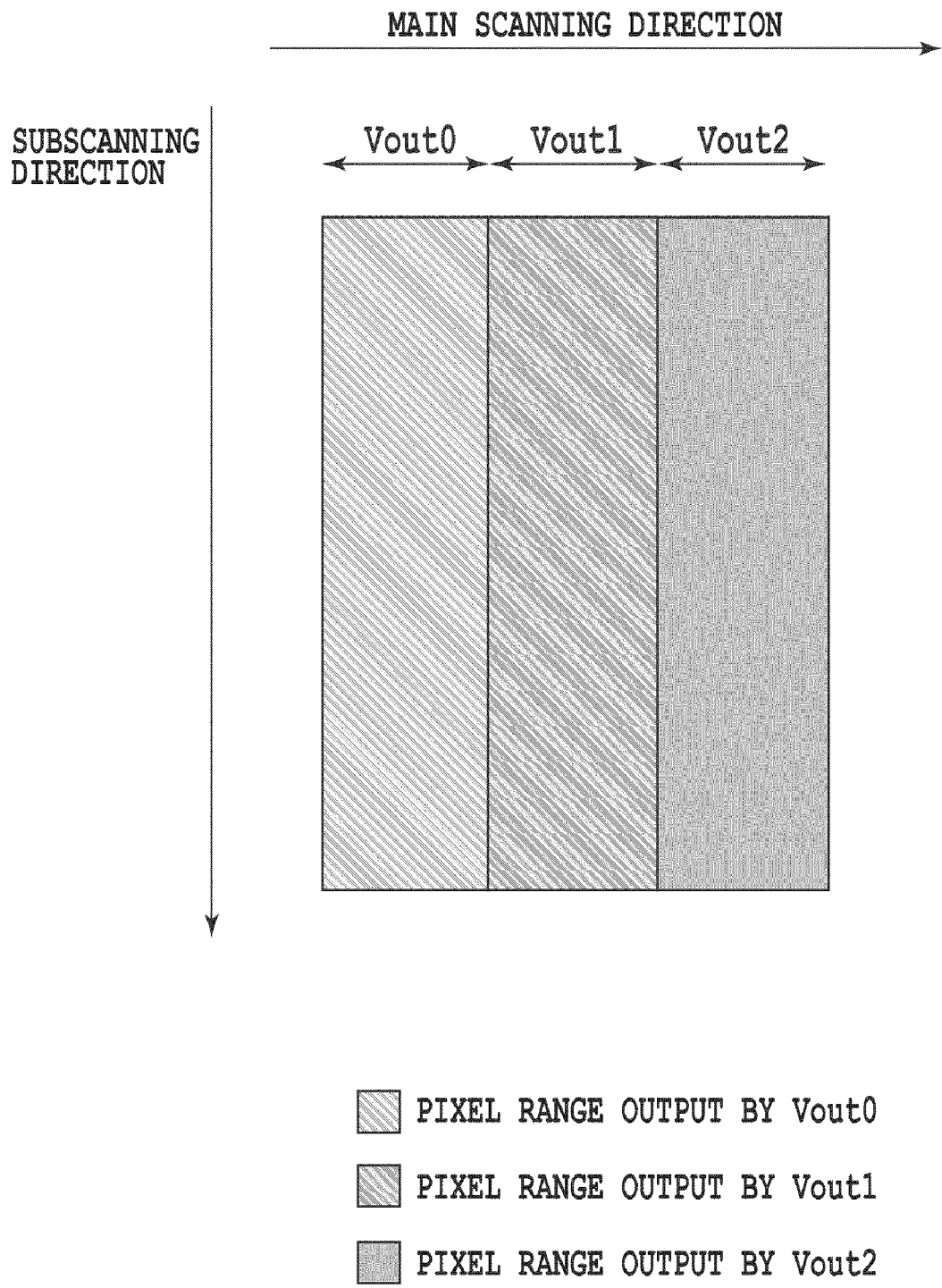
FIG. 14 is a diagram for explaining processing by DMACs.
Figure 15:
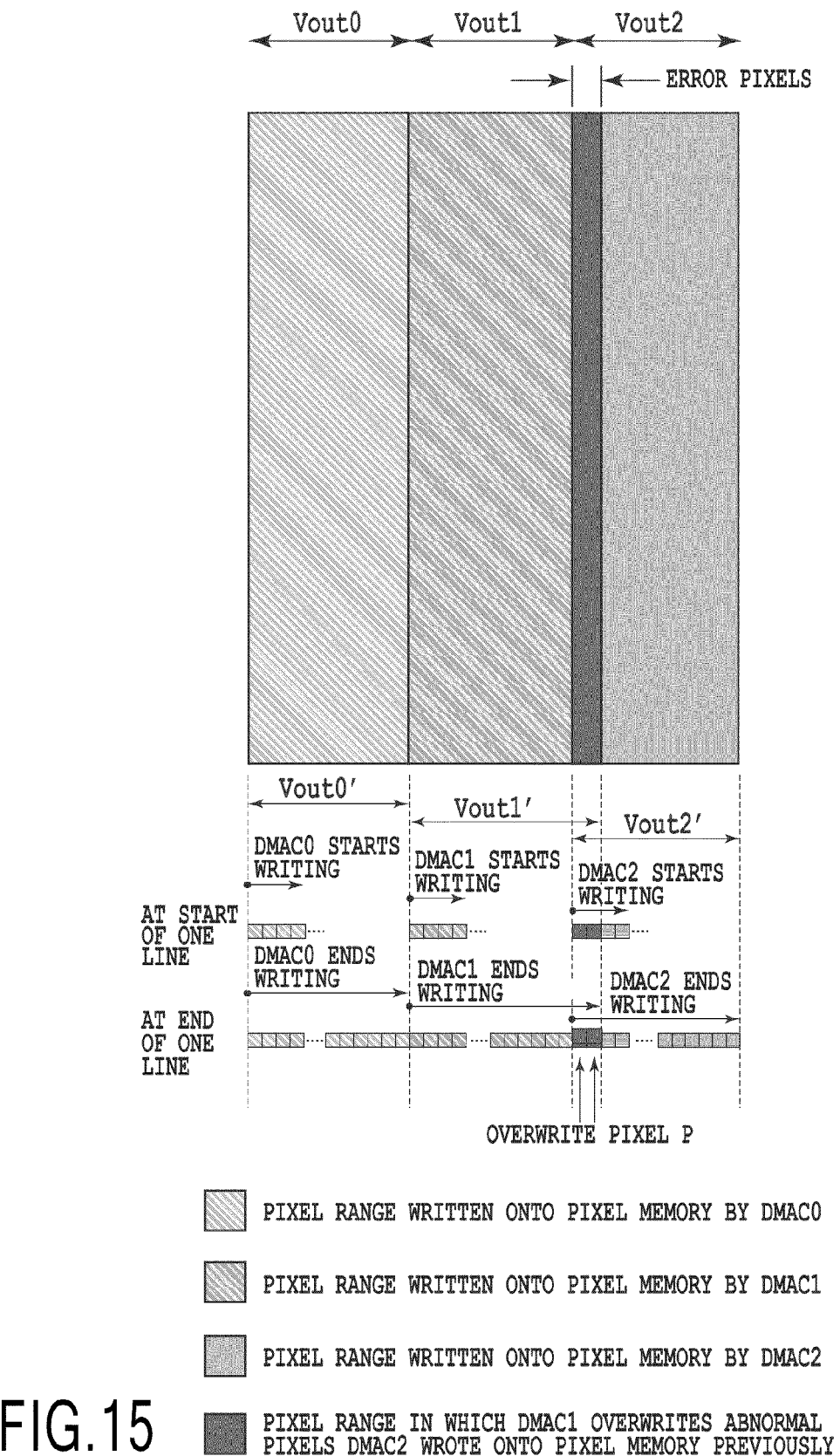
FIG. 15 is a diagram for explaining processing by the DMACs.

FIG. 14 and FIG. 15 are diagrams for explaining processing by the DMAC.

FIG. 14 shows relationships between the pixel signals Vout0, Vout1, and Vout2 that the pixel output blocks of the CIS sensor output, respectively, and the image data of one page. The pixel signals Vout0, Vout1, and Vout2 are obtained by dividing into three divisions in the main scanning direction, and three output ranges are combined into one page image data.

The ranges of the pixel signals Vout0', Vout1', and Vout2' shown in FIG. 5 are the same as the ranges of the pixel signals Vout0, Vout1, and Vout2 shown in FIG. 14. And generally, the DMAC0, DMAC1, and DMAC2 write the range of the pixel signal Vout0, the range of the pixel signal Vout1 and the range of the pixel signal Vout2 into the image memory, respectively, thereby forming the one page image data on the image memory.

FIG. 15 is a diagram for explaining the write ranges of the pixel signals by the DMACs in the present embodiment.

FIG. 15 shows a case where the error pixels are present at the boundary between Vout1 and Vout2. In this case, the range of the pixel signal Vout1' written by the DMAC1 is broader than the range of the pixel output block Vout1. This is because the second error pixel correcting processing unit 2423 generates and outputs just the same width corrected pixels as the error pixels as described above. Accordingly, the increase in the width corresponds to the range of the corrected pixels the DMAC1 overwrites after the DMAC2 wrote the error pixels on the image memory.

The lower part of FIG. 15 shows a manner in which the error pixels are overwritten with the corrected pixels.

At the start of writing the line, the DMAC2 writes the error pixels into the image memory without correction. After completing writing the line, the DMAC1 overwrites the error pixels the DMAC2 has written with the corrected pixels. In FIG. 15, P indicates pixels overwritten.

Controlling in this way makes it possible to form one page image data on the image memory in the state in which the error pixels are corrected.

<Processing Flowchart>

Figure 16:
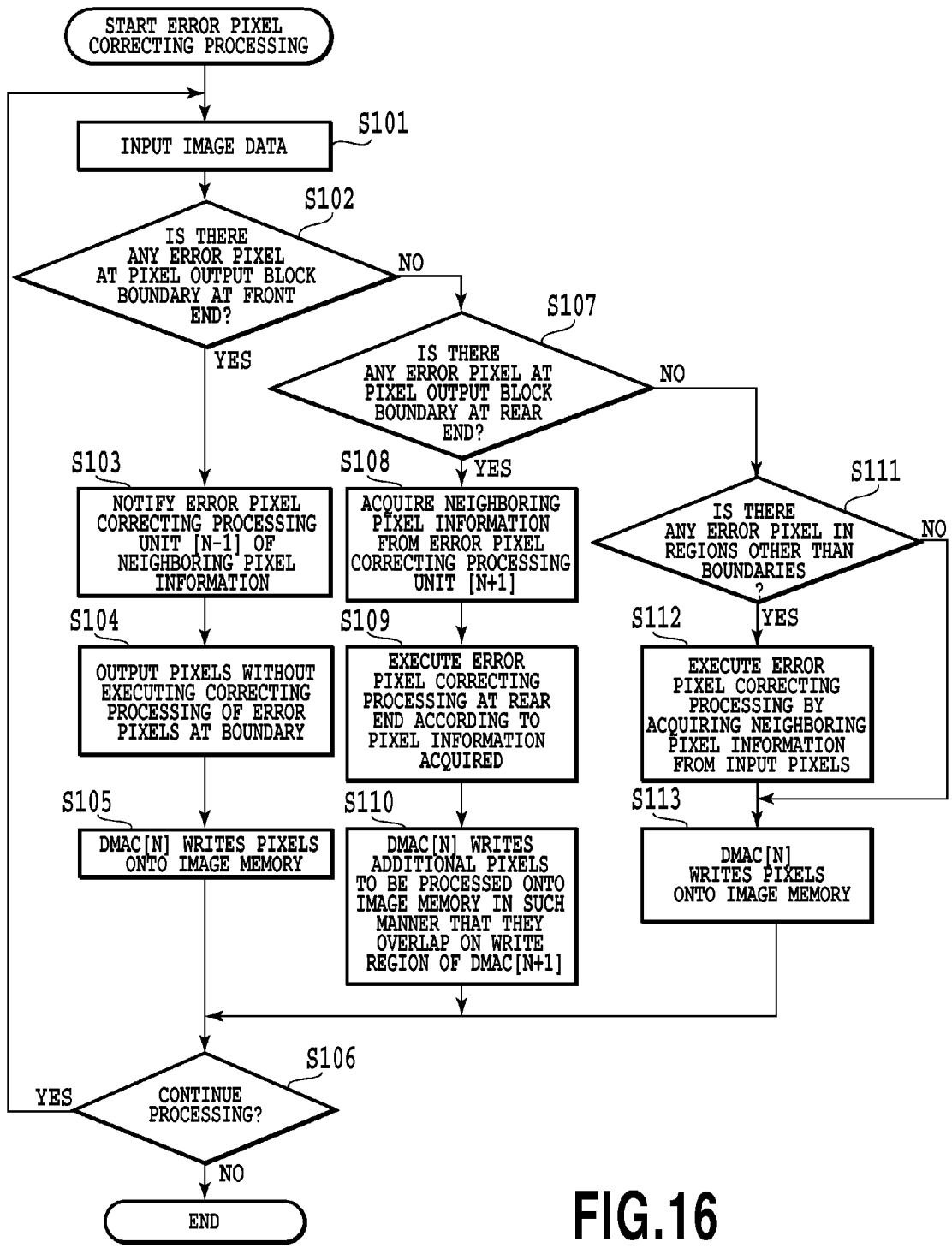
FIG. 16 is a flowchart showing a flow of the error pixel correcting processing.

FIG. 16 is a flowchart showing a flow of the error pixel correcting processing in the present embodiment.

At step S101, the error pixel correcting processing unit [N] receives the image data the scanner 140 reads. Here, N is 1–3, and the error pixel correcting processing unit [1] indicates the foregoing first error pixel correcting processing unit 2422, the error pixel correcting processing unit [2] indicates the second error pixel correcting processing unit 2423, and the error pixel correcting processing unit [3] indicates the third error pixel correcting processing unit 2424.

At step S102, the error pixel correcting processing unit [N] makes a decision as to whether any error pixel is present at the pixel output block boundary near the initial position of the processing. If it makes a decision that any error pixel is present, the processing proceeds to step S103.

At step S103, in response to a request from the error pixel correcting processing unit [N−1] that executes the processing of one block before the pixel output block, the error pixel correcting processing unit [N] notifies the error pixel correcting processing unit [N−1] of the neighboring pixel information.

At step S104, without performing the correcting processing on the error pixels at the pixel output block boundary, the error pixel correcting processing unit [N] outputs the error pixels as they are.

At step S105, the DMAC[N] writes the pixels it receives from the error pixel correcting processing unit [N] into the image memory.

At step S106, the error pixel correcting processing unit [N] makes a decision whether to continue the processing or not, and when continuing the processing, it returns to step S101 to receive the image data, but when discontinuing the processing, it terminates the processing.

At step S102, unless it makes a decision that any error pixel is present at the pixel output block boundary near the initial position of the processing, the error pixel correcting processing unit [N] advances the processing to step S107.

At step S107, the error pixel correcting processing unit [N] makes a decision as to whether any error pixel is present at the pixel output block boundary near the rear end of the processing, and if it decides that any error pixel is present, it advances the processing to step S108.

At step S108, the error pixel correcting processing unit [N] requests the neighboring pixel information necessary for correcting the error pixels from the error pixel correcting processing unit [N+1], and receives it from the error pixel correcting processing unit [N+1].

At step S109, according to the neighboring pixel information it receives, the error pixel correcting processing unit [N] corrects the error pixels at the pixel output block boundary at the rear end.

At step S110, the DMAC [N] writes the corrected pixels it receives from the error pixel correcting processing unit [N] into the image memory. In this case, owing to the correcting processing of the error pixels at the pixel output block boundary at the rear end, the error pixel correcting processing unit [N] outputs the number of output pixels exceeding the pixel output block width of the CIS sensor (although it does not increase owing to the position of the noise). The DMAC [N] writes the additional pixels over the write region of the DMAC[N+1]. Thus, the DMAC [N] overwrites the error pixels the DMAC[N+1] has written on the image memory with the corrected pixels.

At step S107, unless it makes a decision that any error pixel is present at the pixel output block boundary near the rear end of the processing, the error pixel correcting processing unit [N] proceeds to the processing at step S111.

At step S111, the error pixel correcting processing unit [N] makes a decision as to whether any error pixel is present at a position other than the boundary portion, and if it decides that any error pixel is present at a position other than the boundary portion, it proceeds to the processing at step S112.

At step S112, the error pixel correcting processing unit [N] obtains the neighboring pixel information from the input pixels, and executes the error pixel correcting processing. Since the error pixels are present at a position other than the boundary portion, the error pixel correcting processing unit [N] can obtain the neighboring pixel information from the input pixel.

At step S111, unless it makes a decision that any error pixel is present at a position other than the boundary portion, the error pixel correcting processing unit [N] proceeds to the processing at step S113.

At step S113, the DMAC[N] writes the pixels it receives from the error pixel correcting processing unit [N] into the image memory.

At step S106, the error pixel correcting processing unit [N] makes a decision whether to continue the processing or not, and when continuing the processing, it returns to step S101 to receive the image data, but when discontinuing the processing, it terminates the processing.

In the first embodiment of the present invention, only when any error pixel is present at the pixel output block boundary of the CIS sensor, the error pixel correcting processing unit retains the neighboring pixel information on the boundary portion and notifies of it, increases the number of pixels to be processed, and causes the DMACs to carry out the overwriting processing. In a second of the present invention, however, regardless of the presence or absence of the error pixel at the pixel output block boundary of the CIS sensor, each error pixel correcting processing unit is configured in such a manner that it retains the neighboring pixel information on the boundary portion and notifies of it, increases the number of pixels to be processed, and causes the DMACs to carry out the overwriting processing. Such a configuration can simplify the control of the DMACs.

Referring to the drawings, the second embodiment will now be described in detail.

<Copying Machine—Controller—Operating Unit>

The construction of the copying machine, the structure of the CIS sensor and the configuration of the controller in the second embodiment are the same as those of FIG. 1, FIG. 2, and FIG. 3. In addition, the structure of the operating unit is the same as that of FIG. 4. The embodiment 2 differs from the embodiment 1 in the control of the scanner interface image processing unit 2400 of the controller and in the configuration of the error pixel correcting unit 2420.

<Scanner Interface Image Processing Unit>

The configuration of the scanner interface image processing unit is basically the same as that shown in FIG. 5. Only, the internal configuration of the error pixel correcting processing units and the control of the DMACs are different.

Unlike the DMACs of the embodiment 1, the DMACs in the present embodiment always execute the overwriting processing on the image memory at the pixel output block boundary portions regardless of whether any error pixel is present at the pixel output block boundary portions.

<Error Pixel Correcting Unit>

Figure 17:
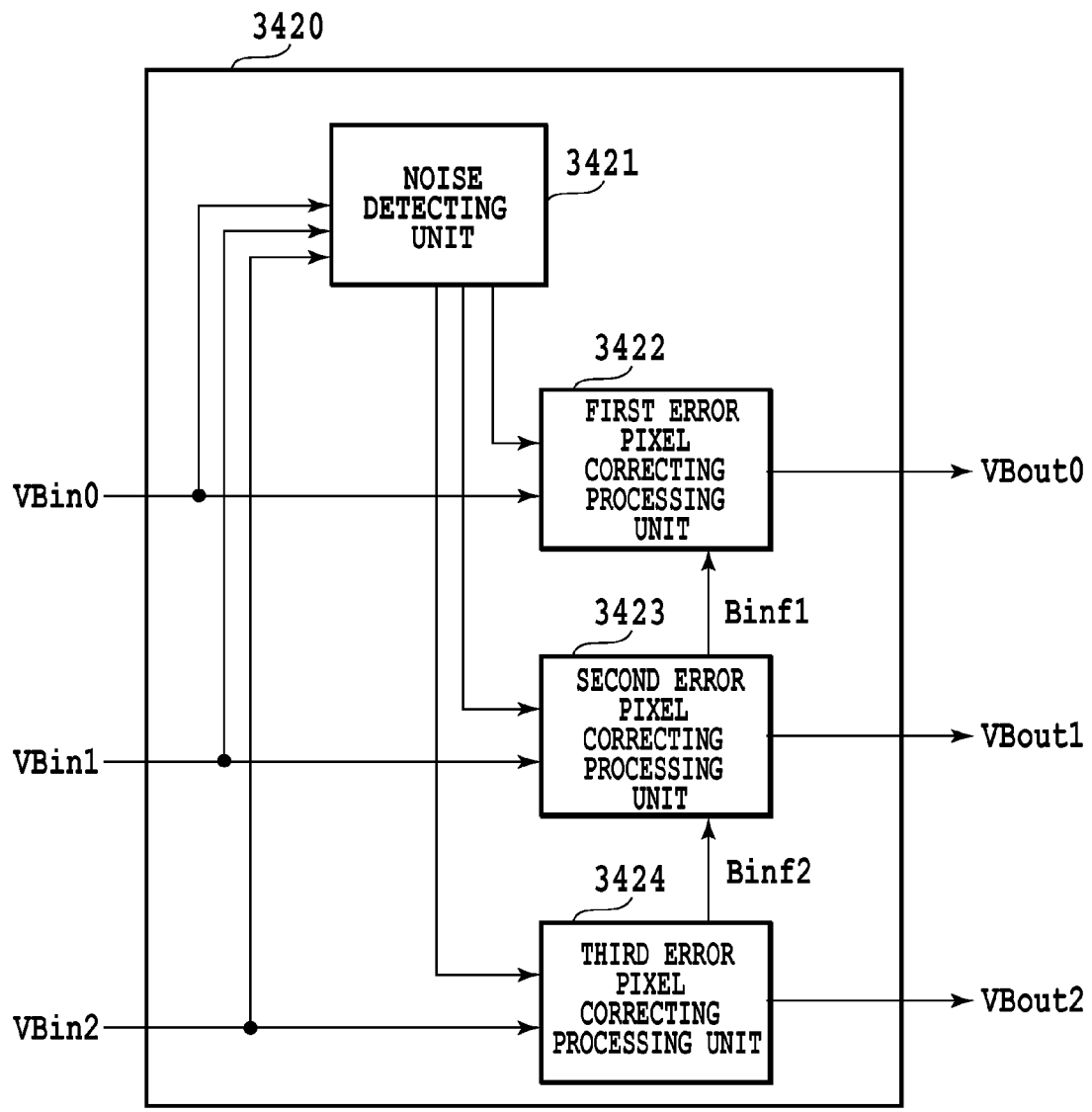
FIG. 17 is a block diagram showing a configuration of an error pixel correcting unit.

FIG. 17 is a block diagram showing a configuration of an error pixel correcting processing unit 3420.

The error pixel correcting processing unit 3420 includes a noise detecting unit 3421 and error pixel correcting processing units (3422-3424).

The error pixel correcting processing units receive pixel signals (VBin0, VBin1 and VBin2) undergoing the shading correction by the shading correcting unit 2410 and the noise information that the noise detecting unit 2421 outputs.

The first error pixel correcting processing unit 3422, second error pixel correcting processing unit 3423 and third error pixel correcting processing unit 3424 receive VBin0, VBin1, and VBin2 respectively.

The error pixel correcting processing units interchange the boundary neighboring pixel information on the boundaries between the pixel output blocks of the CIS sensor. For example, the third error pixel correcting processing unit 3424 notifies the second error pixel correcting processing unit 3423 of the boundary neighboring pixel information Binf2 on the boundary between the pixel output blocks (at the boundary in the main scanning region between the outputs Vout1 and Vout2 of the CIS sensor). Likewise, the second error pixel correcting processing unit 3423 notifies the first error pixel correcting processing unit 3422 of the boundary neighboring pixel information Binf1 on the boundary between the pixel output blocks (at the boundary in the main scanning region between the outputs Vout0 and Vout1 of the CIS sensor). Here, the range of the boundary neighboring pixel information to be notified is determined by the width of the noise and by the write pixel unit of the DMACs. More specifically, the range of the block boundary notified is N times the write unit of the DMACs and exceeds the noise width. For example, assume that the maximum noise width is six pixels and the write pixel unit of the DMACs is a four pixel unit, the range of the block boundary to be notified is up to 8th pixel from the boundary between the pixel output blocks of the CIS sensor. The notification is always made regardless of the presence or absence of noise in contrast with the first embodiment. The notification enables correction even in the case where the write unit of the DMACs is other than one pixel. In addition, the fixed write width of the DMACs can simplify the control and circuit configuration of the DMACs.

Although the present embodiment is configured in such a manner as to retain the boundary neighboring pixel information within the error pixel correcting processing units (3422-3424), it can alternatively be configured to retain the boundary neighboring pixel information outside the error pixel correcting processing units (3422-3424).

<Error Pixel Correcting Unit>

Figure 18:
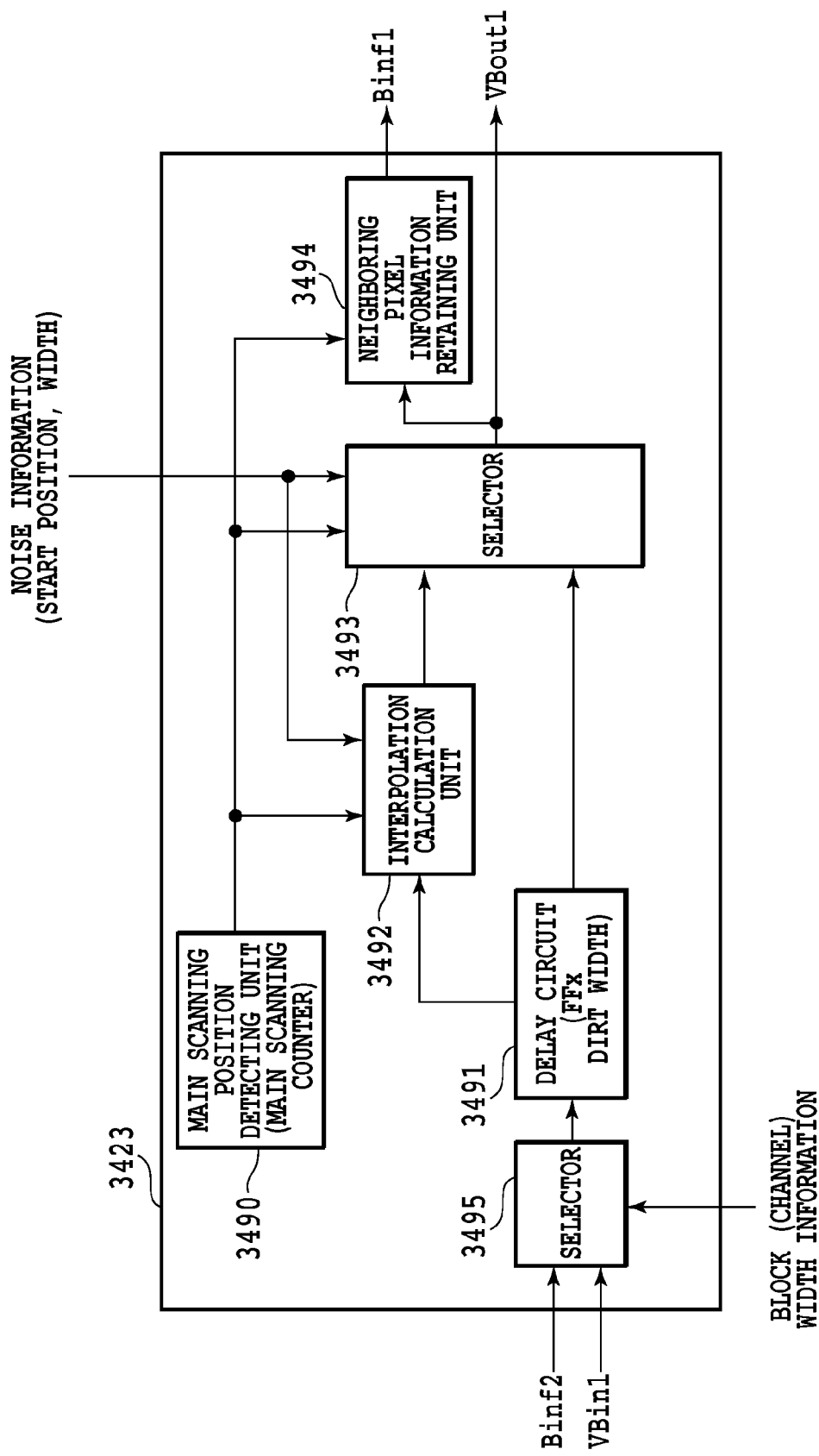
FIG. 18 is a block diagram showing a configuration of an error pixel correcting processing unit.

FIG. 18 is a block diagram showing a configuration of the error pixel correcting processing unit.

Basically, the first error pixel correcting processing unit 3422, second error pixel correcting processing unit 3423, and third error pixel correcting processing unit 3424 have the same configuration. The second error pixel correcting processing unit 3423 will be described as an example.

A main scanning position detecting unit 3490 detects the position of the pixel subjected to the processing presently in the main scanning direction. The main scanning position detecting unit 3490 is chiefly composed of a counter for counting the number of neighboring pixels in the main scanning direction.

A selector 3495 selects either the pixel signal VBin1 fed from the pixel output block 1420 or the boundary neighboring pixel information Binf2 fed from the third error pixel correcting processing unit 3424, and supplies the selected item to a delay circuit 3491. In addition, the selector 3495 receives block width information indicating the number of neighboring pixels in the main scanning direction, which it receives from the pixel output block 1420. Accordingly, at the point where the number of the neighboring pixels processed exceeds the block width, the selector 3495 switches its output from the pixel signal VBin1 to the boundary neighboring pixel information Binf2.

A delay circuit 3491 is a circuit for delaying the pixel signal input to the second error pixel correcting processing unit 3423. By setting the amount of delay at the maximum width of noise, an interpolation calculation unit 3492 becomes able to acquire the boundary neighboring pixel information Da at the left edge of the noise and the boundary neighboring pixel information Db at the right edge necessary for the correcting calculation at the appropriate timing as in the first embodiment.

The interpolation calculation unit 3492 performs linear interpolation on the error pixels. The interpolation calculation unit 3429 compares the position of the pixel being processed received from the main scanning position detecting unit 3490 with the noise information received from the noise detecting unit 3421. Then the interpolation calculation unit 3492 carries out the linear interpolation when it makes a decision that the pixel being processed is an error pixel. Here, the noise information includes the start position of the error pixels in the main scanning direction and the noise width information. The linear interpolation processing is performed using the neighboring pixels at both ends of the noise. As for the interpolation calculation, it is carried out in the same manner as the processing of the first embodiment.

A selector 3493 selects and outputs either the pixel received from the delay circuit 3491 or the pixel from the interpolation calculation unit 3492 in response to the noise information (the occurrence start position of the error pixels in the main scanning direction and the noise width information) received from the noise detecting unit 3421. For example, unless the position of the pixel being processed indicated by the output signal of the main scanning position detecting unit 3490 is the position of the error pixels, the selector 3493 outputs the pixel received from the delay circuit 3491 as VBout1. In contrast, if the position of the pixel being processed is the position of the error pixels, the selector 3493 outputs the pixel received from the interpolation calculation unit 3492 as VBout1.

A boundary neighboring pixel information retaining unit 3494 holds the boundary neighboring pixel information Binf1 to transfer the boundary neighboring pixel information on the pixel output block boundary from the second error pixel correcting processing unit 3423 to the first error pixel correcting processing unit 3422. Here, the second error pixel correcting processing unit 3423 retains the pixels at the block boundary to be notified as the boundary neighboring pixel information Binf1. Then, the second error pixel correcting processing unit 3423 notifies the first error pixel correcting processing unit 3422 of the boundary neighboring pixel information Binf1 in response to a request from the first error pixel correcting processing unit 3422. The first error pixel correcting processing unit 3422 carries out the correcting processing in accordance with the boundary neighboring pixel information received at the boundary between the pixel output blocks 1410 and 1420. A boundary neighboring pixel information retaining unit 3494 identifies the boundary neighboring pixel information to be retained by watching the main scanning position indicated by the output of the main scanning position detecting unit. Here, the boundary neighboring pixel information to be retained also becomes the pixel information to be output from the output portion of the selector 3493.

Here, take an example where the number of the boundary neighboring pixels to be retained is eight. If the eight pixels include another error pixel in addition to the error pixels associated with the block boundary, the second error pixel correcting processing unit corrects the error pixel uninvolved in the block boundary and retains as the boundary neighboring pixel information.

Up to this point, the description is made by way of example of the second error pixel correcting processing unit under the assumption that it has the same configuration as the first error pixel correcting processing unit 3422 and the third error pixel correcting processing unit 3424. Actually, however, the first error pixel correcting processing unit 3422, for example, can alternatively have a configuration of not retaining the boundary neighboring pixel information because it is located at the leftmost section of the blocks of the CIS sensor. In addition, the third error pixel correcting processing unit 3424 can have a configuration of not accepting Binf because it is located at the rightmost section of the blocks of the CIS sensor. In this case, if the noise adheres to the left or right edge of a main scanning line, it can be configured so that the error pixels are replaced by the neighboring pixel closest to the error pixels.

<Error Pixel Correcting Processing>

Figure 19:
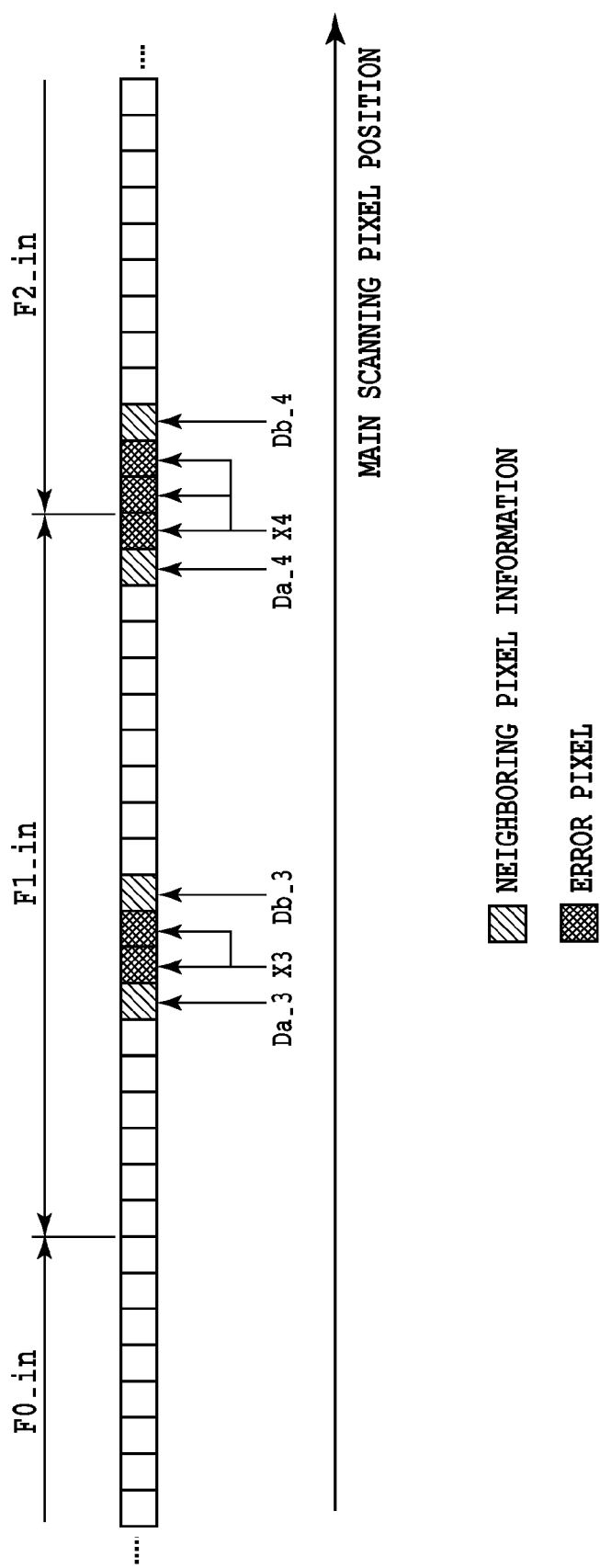
FIG. 19 is a diagram for explaining error pixel correcting processing.

FIG. 19 is a diagram for explaining the error pixel correcting processing.

In FIG. 19, the direction of the arrow indicates the main scanning direction. Each square represents a pixel. The reference symbol X3 designates first error pixels (2-pixel width) the noise detecting unit 3421 detects, and X4 designates second error pixels (3-pixel width). In this case, the neighboring pixels necessary for the correcting processing of X3 are Da_3 and Db_3. Likewise, the neighboring pixels required for the correcting processing of X4 are Da_4 and Db_4. Here, assume that F0_in denotes a pixel output range of the pixel output block 1410 (that is, the pixel input range of the first error pixel correcting processing unit 3422). Thus, F0_in corresponds to the pixel signal Vout0 and the pixel signal VBin0. Likewise, F1_in corresponds to the pixel signal Vout1 and the pixel signal VBin1, and F2_in corresponds to the pixel signal Vout2 and the pixel signal VBin2. Here, the error pixels X3 and their neighboring pixel are included in the pixel input range F1_in. Accordingly, the second error pixel correcting processing unit 3423 corrects the error pixels X3 using the boundary neighboring pixel information Da_3 and Db_3 that it acquires from the pixel signal VBin1. On the other hand, the error pixels X4 are located at the boundary between the pixel input range F1_in and the pixel input range F2_in.

In the embodiment 2, the third error pixel correcting processing unit 3424 notifies the second error pixel correcting processing unit 3423 of the boundary neighboring pixel information including Db_4 regardless of whether the error pixels are located at the boundary between the blocks or not. Thus, the second error pixel correcting processing unit 3423 can perform the correcting processing.

Figure 20:
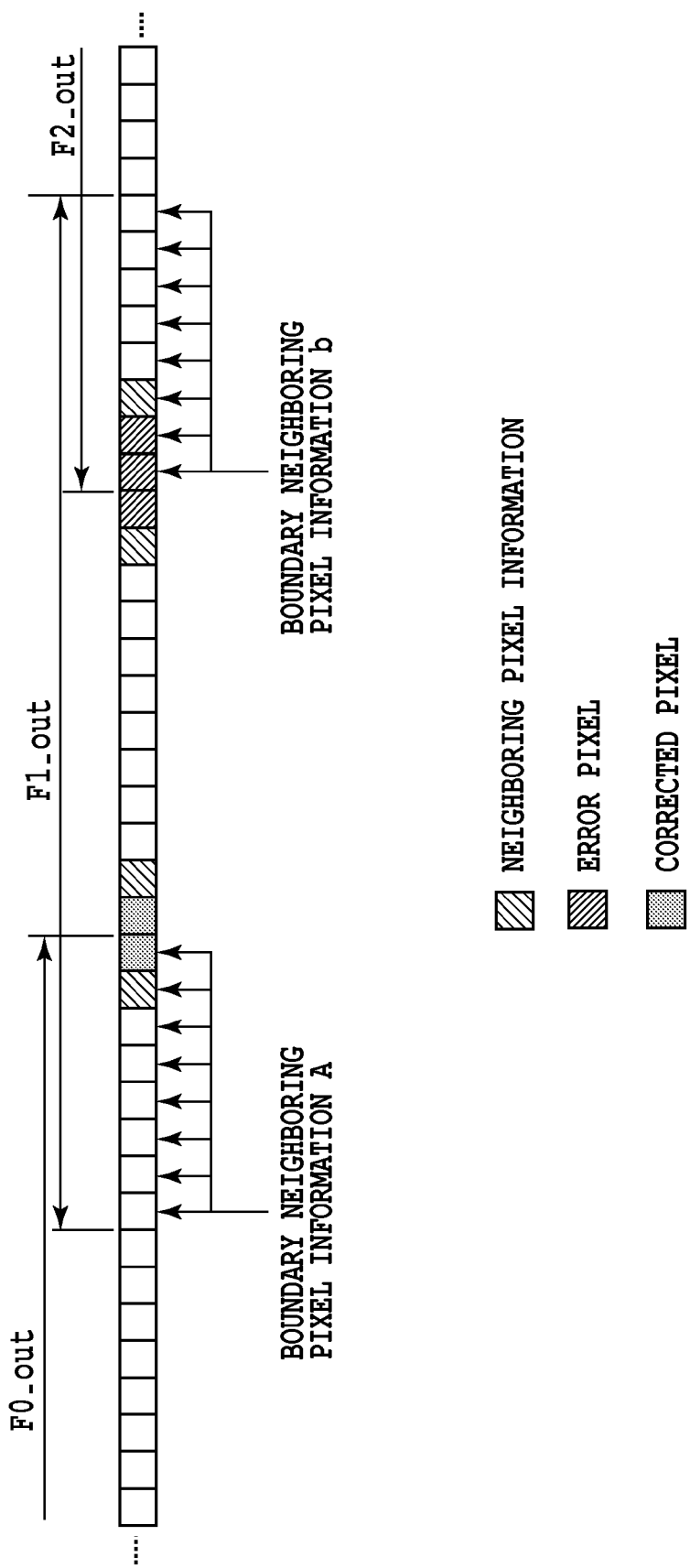
FIG. 20 is a diagram for explaining boundary neighboring pixel information.

FIG. 20 is a diagram for explaining the boundary neighboring pixel information.

FIG. 20 shows an example of the boundary neighboring pixel information with a width of eight pixels. It corresponds to a case where the maximum width of the error pixels to be corrected is six pixels and the write unit of the DMACs is four pixels. Assume that the pixel information on the boundary between the pixel input range F0_in and the pixel input range F1_in is boundary neighboring pixel information A. As can be seen from FIG. 20, although there is no error pixel at the boundary between the pixel input range F0_in and the pixel input range F1_in, the boundary neighboring pixel information A is retained by the second error pixel correcting processing unit 3423 and is supplied to the first error pixel correcting processing unit 3422. If the boundary neighboring pixel information A supplied includes error pixels uninvolved in the boundary such as the error pixels X3, the error pixels are corrected and informed to the first error pixel correcting processing unit 3422. The first error pixel correcting processing unit 3422 outputs additional pixels corresponding to the pixel width of the boundary neighboring pixel information A. Executing the processing even if there is no noise makes it possible to correct the error pixels in the same processing sequence at all times regardless of the presence or absence of the noise. Likewise, assume that the pixel information on the boundary between the pixel input range F1_in and the pixel input range F2_in is boundary neighboring pixel information B. The boundary neighboring pixel information B is retained by the third error pixel correcting processing unit 3424 and is supplied to the second error pixel correcting processing unit 3423. The width of the boundary neighboring pixel information B supplied in this case is assumed to be the same as the width of the boundary neighboring pixel information A. Such control makes it possible to correct the error pixels in the same processing sequence at all times regardless of the width of the noise. In this case, the pixel output range of the first error pixel correcting processing unit 3422 is denoted by F0_out, the pixel output range of the second error pixel correcting processing unit 3423 is denoted by F1_out, and the pixel output range of the third error pixel correcting processing unit 3424 is denoted by F2_out. As in the embodiment 1, overlapping portions of the output ranges are overwritten on the image memory by the DMACs.

<Processing of DMA Controller>

Figure 21:
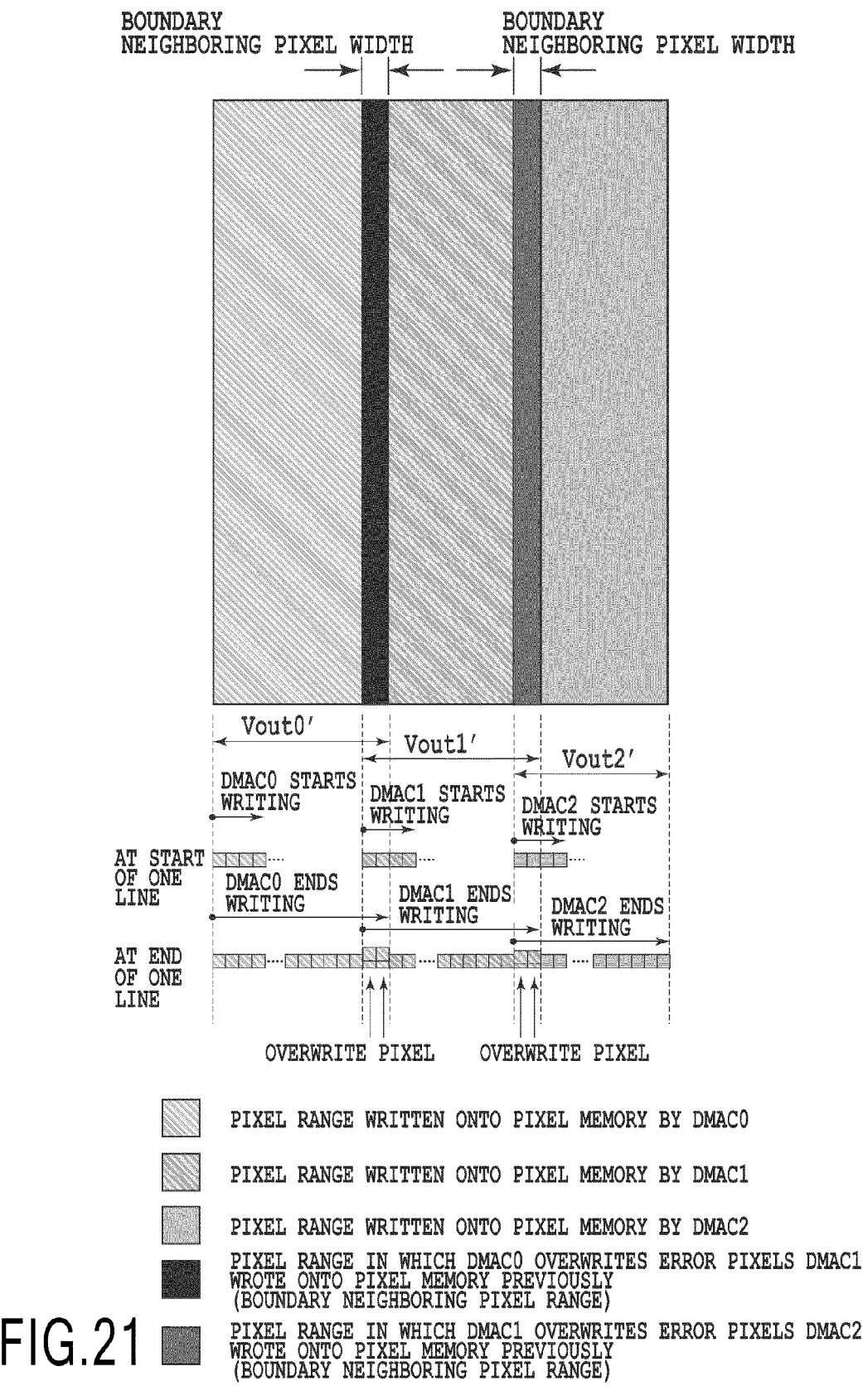
FIG. 21 is a diagram for explaining processing by the DMACs.

FIG. 21 is a diagram for explaining the processing by the DMACs.

The relationships between the outputs Vout0, Vout1, and Vout2 that the pixel output blocks of the CIS sensor output, respectively, and the one page image data are the same as those of embodiment 1 (see FIG. 14).

As can be seen from FIG. 21, the ranges of the pixel signals Vout0' and Vout1' written by the DMAC0 and DMAC1 are broader than the ranges of the pixel output blocks Vout0 and Vout1. This is because the first error pixel correcting processing unit 3422 and the second error pixel correcting processing unit 3423 generate and output the just the same width corrected pixels as the boundary neighboring pixel width as described before. Accordingly, the additional width corresponds to the range of the pixels the DMAC1 (or DMAC 0) overwrites the error pixels that have been written on the image memory by the DMAC2 (or DMAC 1).

The lower part of FIG. 21 shows a manner in which the error pixels are overwritten by the corrected pixels.

At the start of writing a line, the DMAC2 writes the boundary neighboring pixels into the image memory. After completing writing the line, the DMAC1 overwrites the error pixels (that the DMAC2 has written) with the corrected pixels. If the boundary neighboring pixel information does not include any error pixel, the overwrite pixels are the same as the pixels that have been written originally. If the boundary neighboring pixel information include any error pixel, the overwrite pixels are the corrected pixels.

Controlling in this way makes it possible to form one page image data on the image memory in the state in which the error pixels are corrected with the write pixel width (overwrite pixel width) of the DMAC being kept constant.

<Processing Flowchart>

Figure 22:
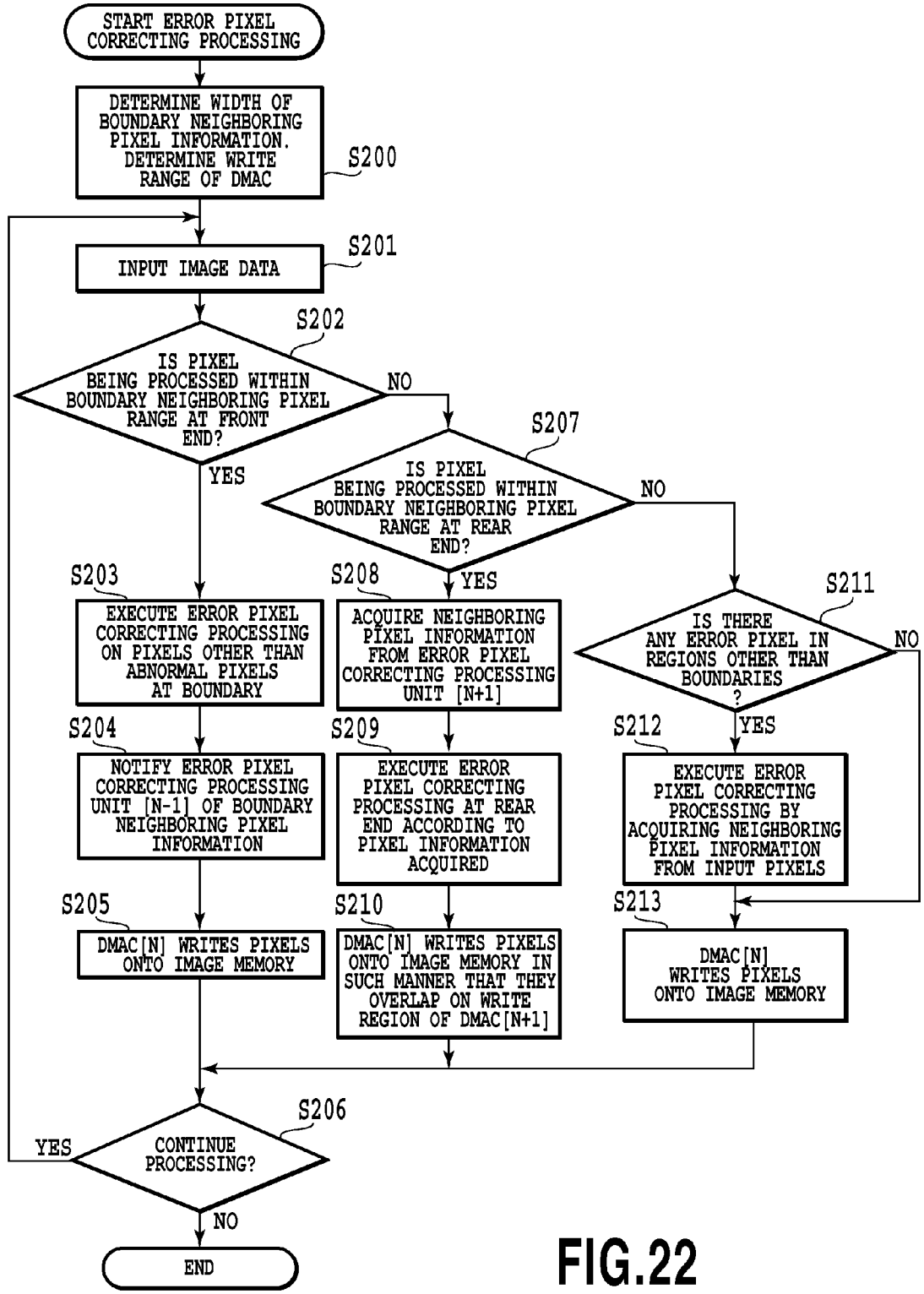
FIG. 22 is a flowchart showing a flow of the error pixel correcting processing.

FIG. 22 is a flowchart showing a flow of the error pixel correcting processing in the present embodiment.

At S200, the error pixel correcting processing unit [N] determines the pixel width of the boundary neighboring pixel information. As described above, it is assumed that the pixel width is N times the write pixel unit of the DMACs and exceeds the maximum width of the error pixels to be corrected. In addition, the pixel width and the pixel output block width of the CIS sensor determine the write range of the DMAC.

At step S201, the error pixel correcting processing unit [N] receives the image data the scanner 140 reads.

At step S202, the error pixel correcting processing unit [N] makes a decision as to whether the current pixel being processed is present within the initial boundary neighboring pixel range or not. If it makes a decision that any error pixel is present within the boundary neighboring pixel range, the processing proceeds to step S203.

At step S203, the error pixel correcting processing unit [N] executes the error pixel correcting processing. Here, the error pixel correcting processing unit [N] performs the correcting processing on the error pixels outside the pixel output block boundary within the boundary neighboring pixel range.

At step S204, in response to a request from the error pixel correcting processing unit [N−1] that executes the processing of one block before the pixel output block, the error pixel correcting processing unit [N] notifies the error pixel correcting processing unit [N−1] of the boundary neighboring pixel information. Accordingly, the error pixel correcting processing unit [N] retains the boundary neighboring pixel information until the error pixel correcting processing unit [N−1] issues the request.

At step S205, the DMAC[N] writes the pixels it receives from the error pixel correcting processing unit [N] into the image memory.

At step S206, the error pixel correcting processing unit [N] makes a decision whether to continue the processing or not, and when continuing the processing, it returns to step S201 to receive the image data, but when discontinuing the processing, it terminates the processing.

At step S207, the error pixel correcting processing unit [N] makes a decision as to whether the current pixel being processed is within the boundary neighboring pixel range at the rear end or not, and if it decides that it is within the boundary neighboring pixel range at the rear end, it proceeds to the processing at step S208.

At step S208, the error pixel correcting processing unit [N] requests the boundary neighboring pixel information on the rear end from the error pixel correcting processing unit [N+1], and receives it from the error pixel correcting processing unit [N+1].

At S209, according to the boundary neighboring pixel information it receives, the error pixel correcting processing unit [N] corrects the error pixels at the pixel output block boundary at the rear end. Here, even if the boundary neighboring pixel information does not include any error pixel, the pixels within the boundary neighboring pixel range are supplied to the next stage.

At step S210, the DMAC [N] writes the corrected pixels it receives from the error pixel correcting processing unit [N] into the image memory. In this case, owing to the processing of the boundary neighboring pixel range described above, the number of output pixels of the error pixel correcting processing unit [N] exceeds the pixel output block width of the CIS sensor. The DMAC [N] writes the additional pixels over the write region of the DMAC[N+1]. Thus, the boundary neighboring pixels the DMAC[N+1] writes into the image memory are overwritten with the boundary neighboring pixels the DMAC[N] outputs.

At step S211, the error pixel correcting processing unit [N] makes a decision as to whether any error pixel is present at a position other than the boundary portion, and if it decides that any error pixel is present at the position other than the boundary portion, it proceeds to the processing at step S212.

At step S212, the error pixel correcting processing unit [N] obtains the boundary neighboring pixel information from the input pixels, and executes the error pixel correcting processing. Since the error pixels are present at a position other than the boundary portion at step S212, the error pixel correcting processing unit [N] can obtain the boundary neighboring pixel information from the input pixel.

At step S211, unless it makes a decision that any error pixel is present at a position other than the boundary portion, the error pixel correcting processing unit [N] proceeds to the processing at step S213.

At step S213, the DMAC[N] writes the pixels it receives from the error pixel correcting processing unit [N] into the image memory.

At step S206, the error pixel correcting processing unit [N] makes a decision whether to continue the processing or not, and when continuing the processing, it returns to step S201 to receive the image data, but when discontinuing the processing, it terminates the processing.

The present invention may be accomplished by loading the system or apparatus with a storage medium that records program code of software for implementing the functions of the foregoing embodiments, and by causing a computer of the system or the like to read and execute the program code from the storage medium. The storage medium, for example, may be a computer readable storage medium. In this case, the program code itself read out of the storage medium implements the functions of the foregoing embodiments. Accordingly, the storage medium that stores the program code constitutes one aspect of the present invention. Besides, the functions of the foregoing embodiments can be accomplished by the processing in which an operating system (OS) and the like working on the computer performs part or all of the actual processing in accordance with the instructions of the program code. Furthermore, the functions of the foregoing embodiments can also be implemented by writing the program code read out of the storage medium into an expansion board or expansion unit of the computer, and then by causing the expansion board or the like to execute part or all of the processing in accordance with the instructions of the program code.

When applying the present invention to the foregoing storage medium, the storage medium stores the program code corresponding, for example, to the flowcharts described before.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-003495 filed Jan. 10, 2008, which is hereby incorporated by reference herein in its entirety.

What is claimed is:

1. An image processing device comprising:
   an image reading component configured to read an original document image with a plurality of image sensors arranged in series, and to divide pixel signals corresponding to one main scanning line read out into N blocks, and to output pixel signals corresponding to one main scanning line by outputting data from each of the N blocks;
   a detecting component configured to detect presence or absence of a factor of black line on a platen or white board from the pixel signals output from the image reading component; and
   a series of error pixel correcting processing components each configured to receive the data from a corresponding block among the data output from the N blocks by the image reading component, and to correct error pixels brought about by the factor of black line the detecting component detects, wherein
   when the detecting component detects the factor of black line at a boundary between a Kth block and a (K−1)th block of the N blocks, the Kth error pixel correcting processing component notifies the (K−1)th error pixel correcting processing component of neighboring pixel information about the error pixels, and the (K−1)th error pixel correcting processing component corrects the error pixels at the boundary in response to the neighboring pixel information notified and the data from the (K−1)th block.

2. The image processing device as claimed in claim 1, further comprising a series of DMA controllers and an image memory, wherein
   the Kth DMA controller writes the output of the Kth error pixel correcting processing component into the image memory.

3. The image processing device as claimed in claim 1, wherein
   when the detecting component detects the factor of black line at the boundary between the Kth block and (K−1)th block of the image reading component, the (K−1)th DMA controller replaces the error pixels the Kth DMA controller wrote on the image memory with corrected pixels.

4. An image processing device comprising:
   an image reading component configured to read an original document image with a plurality of image sensors arranged in series, and to divide pixel signals corresponding to one main scanning line read out into N blocks, and to output pixel signals corresponding to one main scanning line by outputting data from each of the N blocks;
   a detecting component configured to detect presence or absence of a factor of black line on a platen or white board from the pixel signals output from the image reading component; and
   a series of error pixel correcting processing components each configured to receive the data from a corresponding block among the data output from the N blocks by the image reading component, and to correct error pixels brought about by the factor of black line the detecting component detects, wherein
   the Kth error pixel correcting processing component notifies the (K−1)th error pixel correcting processing component of boundary neighboring pixel information on a boundary between a Kth block and a (K−1)th block of the N blocks, and the (K−1)th error pixel correcting processing component corrects the error pixels at the boundary in response to the boundary neighboring pixel information notified and the data from the (K−1)th block.

5. The image processing device as claimed in claim 4, further comprising a series of DMA controllers and an image memory, wherein
   the Kth DMA controller writes the output of the Kth error pixel correcting processing components into the image memory.

6. The image processing device as claimed in claim 5, wherein
   the (K−1)th DMA controller replaces the error pixels at the boundary, that the Kth DMA controller wrote on the image memory, with corrected pixels.

7. The image processing device as claimed in claim 4, wherein
   the number of pixels the boundary neighboring pixel information indicates is determined by a width of the error pixels and a write pixel unit of the DMA controller.

8. The image processing device as claimed in claim 4, wherein
   when the error pixels are present in the boundary neighboring pixel information, but are not involved in the output of boundary between the Kth block and (K−1)th block of the image reading component, the error pixel correcting processing component corrects the error pixels and then notifies another of the error pixel correcting processing components of the boundary neighboring pixel information.

9. An image processing method using an image reading component, a detecting component, a Kth error pixel correcting processing component, and a (K−1)th error pixel correcting processing component, the image processing method comprising:
   an outputting step in which the image reading component reads out an original document image with a plurality of image sensors arranged in series, divides pixel signals corresponding to one main scanning line read out into N blocks, and outputs output pixel signals corresponding to one main scanning line by outputting data from each of the N blocks;
   a detecting step in which the detecting component detects presence or absence of a factor of black line on a platen or white board from the pixel signals output from the image reading component; and
   an error pixel correcting step in which the Kth error pixel correcting processing component receives the data from Kth block among the data output from the N blocks by the image reading component, and corrects error pixels brought about by the factor of black line that the detecting component detects, wherein
   the error pixel correcting step comprises, when the detecting component detects the factor of black line at a boundary between a Kth block and a (K−1)th block of the N blocks:
   a step in which the Kth error pixel correcting processing component notifies the (K−1)th error pixel correcting processing component of neighboring pixel information about the error pixels; and
   a step in which the (K−1)th error pixel correcting processing component corrects the error pixels at the boundary in response to the neighboring pixel information notified and the data from (K−1)th block.

10. An image processing method using an image reading component, a detecting component, a Kth error pixel correcting processing component, and a (K−1)th error pixel correcting processing component, the image processing method comprising:
- an outputting step in which the image reading component reads out an original document image with a plurality of image sensors arranged in series, and divides pixel signals corresponding to one main scanning line read out into N blocks, and outputs output pixel signals corresponding to one main scanning line by outputting data from the N blocks;
- a detecting step in which the detecting component detects presence or absence of a factor of black line on a platen or white board from the pixel signals output from the image reading component; and
- an error pixel correcting step in which the Kth error pixel correcting processing component receives the data from a Kth block among the data output from the N blocks by the image reading component, and corrects error pixels brought about by the factor of black line the detecting component detects, wherein the error pixel correcting step comprises:
- a step in which the Kth error pixel correcting processing component notifies the (K−1)th error pixel correcting processing component of boundary neighboring pixel information on a boundary between the Kth block and a (K−1)th block of the N blocks; and
- a step in which the (K−1)th error pixel correcting processing component corrects the error pixels at the boundary in response to the boundary neighboring pixel information notified and the data from the (K−1)th block.

11. A non-transitory computer-readable medium embodying a program of computer-executable instructions for performing the image processing method as claimed in claim 10 using the image reading component.

* * * * *